(12) United States Patent
Hayashi et al.

(10) Patent No.: US 7,622,842 B2
(45) Date of Patent: Nov. 24, 2009

(54) ROTARY ELECTRIC MACHINE AND STATOR FOR ROTARY ELECTRIC MACHINES

(75) Inventors: Noriyuki Hayashi, Okazaki (JP); Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 79 days.

(21) Appl. No.: 11/703,156

(22) Filed: Feb. 7, 2007

(65) Prior Publication Data
US 2007/0200449 A1  Aug. 30, 2007

(30) Foreign Application Priority Data
Feb. 10, 2006  (JP)  ............... 2006-033750

(51) Int. Cl.
*H02K 11/00* (2006.01)
(52) U.S. Cl. .................. 310/179; 310/71; 310/184; 310/180
(58) Field of Classification Search ............ 310/179, 310/180, 201, 184, 198, 71
See application file for complete search history.

(56) References Cited

U.S. PATENT DOCUMENTS

| | | | |
|---|---|---|---|
| 6,515,392 B2 * | 2/2003 | Ooiwa | .............. 310/179 |
| 6,617,723 B1 | 9/2003 | Shichijyo | |
| 6,784,583 B2 | 8/2004 | Umeda | |
| 6,800,974 B2 | 10/2004 | Shichijyo | |
| 7,030,533 B2 | 4/2006 | Umeda | |
| 2001/0024071 A1 * | 9/2001 | Yoshida et al. | .............. 310/201 |
| 2002/0180299 A1 | 12/2002 | Oohashi et al. | |
| 2003/0135980 A1 * | 7/2003 | Ichikawa et al. | .............. 29/596 |
| 2003/0218394 A1 | 11/2003 | Hashiba et al. | |
| 2004/0150284 A1 * | 8/2004 | Umeda | .............. 310/179 |
| 2006/0220488 A1 * | 10/2006 | Koike et al. | .............. 310/179 |

FOREIGN PATENT DOCUMENTS

| | | |
|---|---|---|
| JP | 2002-247787 | 8/2002 |
| JP | A-2002-354736 | 12/2002 |
| JP | 2003-180048 | 6/2003 |
| JP | A-2003-348780 | 12/2003 |
| JP | A-2005-045987 | 2/2005 |

OTHER PUBLICATIONS

Japanese Office Action dated May 26, 2009 with English translation.

* cited by examiner

*Primary Examiner*—Quyen Leung
*Assistant Examiner*—Naishadh N Desai
(74) *Attorney, Agent, or Firm*—Oliff & Berridge, PLC

(57) ABSTRACT

In a rotary electric machine, output ends of first and second three-phase windings of first and second sets included in a first group are separated from those of third and fourth three-phase windings of third and fourth sets included in a second group. Each of the first to fourth three-phase windings is inserted in the slots while being turned at one of the first and second opposing end surface sides of a stator core. Turn portions of each of the first to fourth three-phase windings at the one of the first and second opposing end surface sides of the stator core have a substantially U shape, and are so disposed as to be nonoverlapped with each other in an axial direction of the stator core.

13 Claims, 11 Drawing Sheets

FIRST GROUPED ENDS

SECOND GROUPED ENDS

SLOT RADIAL DIRECTION

ROTARY ELECTRIC MACHINE AND STATOR FOR ROTARY ELECTRIC MACHINES

CROSS REFERENCE TO RELATED APPLICATIONS

This application is based on Japanese Patent Application 2006-033750 filed on Feb. 10, 2006. This application claims the benefit of priority from the Japanese Patent Application, so that the descriptions of which are all incorporated herein by reference.

FIELD OF THE INVENTION

The present invention relates to rotary electric machines installable in, for example, vehicles, such as passenger automobiles and trucks. In addition, the present invention relates to stator coils for rotary electric machines installable in vehicles, such as passenger automobiles and trucks.

BACKGROUND OF THE INVENTION

Rotary electric machines have been used for vehicles. One type of the rotary electric machines is disclosed in U.S. Patent Publication No. 6,784,583 corresponding to Japanese Unexamined Patent Publication No. 2002-247787. The rotary electric machine disclosed in the U.S. Patent Publication has a stator coil consisting of a pair of first and second sets of three-phase windings. The three-phase windings of the first set have junctions serially connected to each other in delta (Δ) configuration, and the three-phase windings of the second set have output and input ends; these input ends are respectively connected in series to the junctions of the delta-connected three-phase windings of the first set.

Use of the above structured first and second sets of three-phase windings allows the number of turns of each winding to be freely set. For example, the number of turns of each winding of the first and second sets is different from that of turns of each winding of normally star-connected three-phase windings.

The U.S. Patent Publication No. 6,784,583 also discloses a stator coil having a configuration with first and second groups of first and second sets of three-phase windings. In this U.S. Patent Publication, a modification of the configuration in which the first group of the first and second sets of three-phase windings is shifted from the second group of those of three-phase windings by an electric angle of π/6 radian in phase is disclosed. This modification permits magnetic noise caused from the first and second groups of three-phase windings to decrease.

Another one type of the conventional rotary electric machines is disclosed in U.S. Patent Publications No. 6,800,974 and No. 6,617,723, which correspond to Japanese Unexamined Patent Publication No. 2003-180048. The rotary electric machine disclosed in these U.S. Patent Publications consists of first and second sets of normally star-connected three phase windings.

In the U.S. Patent Publication No. 6,784,583, wiring configuration of the three-phase windings of the first and second sets of the pair of the stator coil is schematically illustrated in FIG. 6 of the Patent Publication as an example. Specifically, in FIG. 6 of the Patent Publication, arrangement of connections between the junctions of the three-phase windings of the first set of the pair and the input ends of the three-phase windings of the second set thereof by leads is illustrated.

The U.S. Patent Publication No. 6,784,583, however, provides no specific examples of wiring configuration for the three-phase windings of the first and second sets of each of the first and second groups of the stator coil.

Accordingly, there is a need for providing such a specific example of wiring configuration for the three-phase windings of the first and second sets of each of the first and second groups of the stator coil in order to increase the usefulness of the stator coil set forth above.

Particularly, because the number of three-phase windings of the first and second sets of each of the first and second groups of the stator coil is larger than that of three-phase windings of the first and second sets of the pair of the stator coil, a more simplified wiring configuration is needed.

SUMMARY OF THE INVENTION

In view of the background, an object of at least one aspect of the present invention is to simplify wiring configuration for three-phase windings of first and second sets of each of first and second groups of a stator coil.

According to one aspect of the present invention, there is provided a rotary electric machine. The rotary electric machine includes a rotor rotatably supported in a frame of the machine, and a stator disposed opposite to the rotor. The stator includes a stator core having axially opposing end surfaces and a plurality of substantially circumferentially spaced slots, and a stator coil. The stator coil includes a first group of first and second sets of three-phase windings mounted in the stator core. The first set includes first three-phase windings each with output ends. The output ends of the first three-phase windings are connected in series to each other to form delta configuration with junctions between the first three-phase windings. The second set includes second three-phase windings having output and input ends. The input ends are respectively connected in series to the junctions of the first three-phase windings. The stator coil includes a second group of third and fourth sets of three-phase windings mounted in the stator core. The third set includes third three-phase windings each with output ends. The output ends of the third three-phase windings are connected in series to each other to form delta configuration with junctions between the third three-phase windings. The fourth set includes fourth three-phase windings having output and input ends. The input ends are respectively connected in series to the junctions of the third three-phase windings. The output ends of the first to fourth three-phase windings and the input ends of the second and fourth windings are disposed at one of the opposing end surface sides of the stator core. The output ends of the first and second three-phase windings of the first and second sets included in the first group are separated from the output ends of the third and fourth three-phase windings of the third and fourth sets included in the second group. Each of the first to fourth three-phase windings is inserted in the slots while being turned at the one of the first and second opposing end surface sides of the stator core. Turn portions of each of the first to fourth three-phase windings at the one of the first and second opposing end surface sides of the stator core have a substantially U shape, and are so disposed as to be nonoverlapped with each other in an axial direction of the stator core.

According to another aspect of the present invention, there is provided a rotary electric machine. The rotary electric machine includes a rotor rotatably supported in a frame of the machine, and a stator disposed opposite to the rotor. The stator includes a stator core having axially opposing end surfaces and a plurality of substantially circumferentially spaced slots, and a stator coil. The stator coil includes a first group of first and second sets of three-phase windings mounted in the stator core. The first set includes first three-phase windings each with output ends disposed respectively at circumferential positions opposite the stator core. The output ends of the first three-phase windings are connected in series to each other to form delta configuration with junctions between the first three-phase windings. The second set includes second three-phase windings having output and input ends. The input ends are respectively connected in series to the junctions of the first three-phase windings. The stator coil includes a second group of third and fourth sets of three-phase windings mounted in the stator core. The third set includes third three-phase windings each with output ends disposed respectively at circumferential positions opposite the stator core. The output ends of the third three-phase windings are connected in series to each other to form delta configuration with junctions between the third three-phase windings. The fourth set includes fourth three-phase windings having output and input ends. The input ends are respectively connected in series to the junctions of the third three-phase windings. The output ends of the first to fourth three-phase windings and the input ends of the second and fourth windings are disposed at one of the opposing end surface sides of the stator core. Each of the first to fourth three-phase windings is inserted in the slots while being turned at the one of the first and second opposing end surface sides of the stator core. The circumferential positions of the output positions of at least one of the first three-phase windings and the third three-phase windings are disposed to be included in the circumferential positions of the output ends of at least one of the second three-phase windings and the fourth three-phase windings. Turn portions of each of the first to fourth three-phase windings at the one of the first and second opposing end surface sides of the stator core have a substantially U shape, and are so disposed as to be nonoverlapped with each other in an axial direction of the stator core.

According to a further aspect of the present invention, there is provided a stator including a stator core and a stator coil. The stator core has axially opposing end surfaces and a plurality of substantially circumferentially spaced slots. The stator coil includes a first group of first and second sets of three-phase windings mounted in the stator core. The first set includes first three-phase windings each with output ends. The output ends of the first three-phase windings is connected in series to each other to form delta configuration with junctions between the first three-phase windings. The second set includes second three-phase windings having output and input ends. The input ends are respectively connected in series to the junctions of the first three-phase windings. The stator coil includes a second group of third and fourth sets of three-phase windings mounted in the stator core. The third set includes third three-phase windings each with output ends. The output ends of the third three-phase windings are connected in series to each other to form delta configuration with junctions between the third three-phase windings. The fourth set includes fourth three-phase windings having output and input ends. The input ends are respectively connected in series to the junctions of the third three-phase windings. The output ends of the first to fourth three-phase windings and the input ends of the second and fourth windings are disposed at one of the opposing end surface sides of the stator core. The output ends of the first and second three-phase windings of the first and second sets included in the first group are separated from the output ends of the third and fourth three-phase windings of the third and fourth sets included in the second group. Each of the first to fourth three-phase windings is inserted in the slots while being turned at the one of the first and second opposing end surface sides of the stator core. Turn portions of each of the first to fourth three-phase windings at the one of the first and second opposing end surface sides of the stator core have a substantially U shape, and are so disposed as to be nonoverlapped with each other in an axial direction of the stator core.

According to a still further aspect of the present invention, there is provided a stator including a stator core and a stator coil. The stator core has axially opposing end surfaces and a plurality of substantially circumferentially spaced slots. The stator coil includes a first group of first and second sets of three-phase windings mounted in the stator core. The first set includes first three-phase windings each with output ends disposed respectively at circumferential positions opposite the stator core. The output ends of the first three-phase windings are connected in series to each other to form delta configuration with junctions between the first three-phase windings. The second set includes second three-phase windings having output and input ends. The input ends are respectively connected in series to the junctions of the first three-phase windings. The stator coil includes a second group of third and fourth sets of three-phase windings mounted in the stator core. The third set includes third three-phase windings each with output ends disposed respectively at circumferential positions opposite the stator core. The output ends of the third three-phase windings are connected in series to each other to form delta configuration with junctions between the third three-phase windings. The fourth set includes fourth three-phase windings having output and input ends, the input ends being respectively connected in series to the junctions of the third three-phase windings. The output ends of the first to fourth three-phase windings and the input ends of the second and fourth windings are disposed at one of the opposing end surface sides of the stator core. Each of the first to fourth three-phase windings is inserted in the slots while being turned at the one of the first and second opposing end surface sides of the stator core. The circumferential positions of the output positions of at least one of the first three-phase windings and the third three-phase windings are disposed to be included in the circumferential positions of the output ends of at least one of the second three-phase windings and the fourth three-phase windings. Turn portions of each of the first to fourth three-phase windings at the one of the first and second opposing end surface sides of the stator core have a substantially U shape, and are so disposed as to be nonoverlapped with each other in an axial direction of the stator core.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

An embodiment of the present invention will be described hereinafter with reference to the accompanying drawings.

Figure 1:
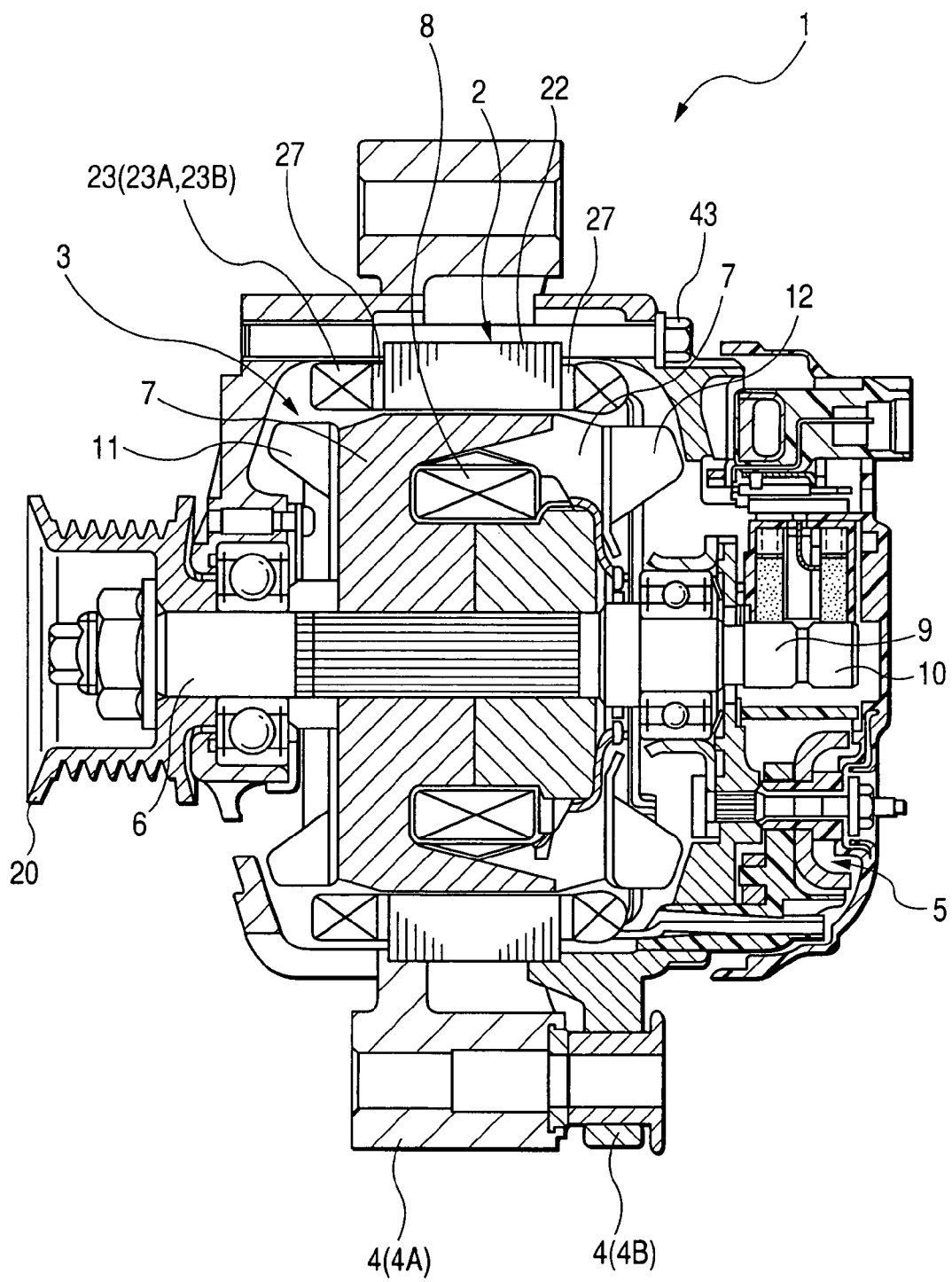
FIG. 1 is a partially axial sectional view illustrating an alternator according to an embodiment of the present invention.

Referring to the drawings, in which like reference characters refer to like parts in several views, particularly to FIG. 1, there is illustrated an alternator 1 for vehicles, as an example of rotary electric machines.

The alternator 1 installed in, for example, a vehicle includes a stator 2, a rotor 3, a frame 4, a rectifier assembly 5, a voltage regulator and so on.

The stator 2 is composed of a stator core 22. The stator core 22 has, for example, a substantially annular shape and first and second annular axial end surfaces. The stator core 22 also has a plurality of (e.g. 96) slots 24 (see FIGS. 5 to 7 hereinafter). For example, slot numbers of #1 to #96 are sequentially allocated in the 96 slots (see FIGS. 5 to 7). The slots 24 are formed through the stator core 22 and are circumferentially arranged at given intervals. The circumferential interval of adjacent slots defines a slot pitch corresponding to an electric angle of, for example, $\pi/6$ radian. Each of the slots 24 has a predetermined length in a radial direction of the stator core 22.

The stator core 22 is fixed to an inner peripheral wall of the frame 4. The stator 2 is also composed of a stator coil 23. The stator coil 23 is wound in the slots 24 of the stator core 22. The stator core 22 further has insulators 27 inserted between conductor portions of the stator coil 23 disposed in the slots 24 and inner peripheral surfaces of the slots 24 to insulate therebetween.

The stator coil 23 is composed of first and second groups 23A and 23B of first and second sets of three-phase windings. The second group 23B of first and second sets of three-phase windings is shifted by an electric angle of $\pi/6$ radian (30 degrees) in phase from the first group 23A of first and second sets of three-phase windings.

The stator coil 23 has first and second coil end portions CE1 and CE2 axially opposed to each other and projecting from the first and second axial end surfaces of the stator core 22. For example, ends of windings of each phase included in the first and second groups 23A and 23B are drawn out from one of the first and second coil end portions CE1 and CE2 of the stator coil 23. In the embodiment, ends of windings of each phase included in the first and second groups 23A and 23B are drawn out from the first coil end portion CE1 of the stator coil 23. Further details on each of the first and second groups 23A and 23B of first and second sets of three-phase windings will be described hereinafter.

The rotor 3 is attached to a rotary shaft 6 rotatably supported in the frame 4 by bearings so that it is disposed within the stator core 22. One end of the rotary shaft 6 is linked to a pulley 20 such that the rotary shaft 6 is rotatably driven by an engine (not shown) mounted in the vehicle through the pulley 20.

Specifically, the rotor 3 is composed of a Lundell type (claw pole) core 7. The Lundell type core 7 has a pair of opposing circuit plates axially assembled to the rotary shaft 6 and a plurality of claw portions extending from the outer peripheral side of the circular plates. The claw portions of one of the circuit plates and those of the other thereof are alternatively arranged in the circumferential direction of the rotor 3.

The rotor 3 is also composed of field windings 8 provided between the circular plates of the pole core 7, slip rings 9 and 10, and brushes. The slip rings 9 and 10 and the brushes are configured to provide electrical connections between the field windings 8 and a power supply. The rotor 3 is also composed of a diagonal flow cooling fan 11 and a centrifugal cooling fan 12 that allow cooling air to be delivered into the frame 4 by the rotation of the fans 11 and 12 together with that of the rotor 3. For example, the number of the claw portions is twelve, which corresponds to the number of poles of the rotor 3, and six slots of the stator core 22 correspond to each pole.

The frame 4 is configured to accommodate the stator 2 and the rotor 3 such that the stator core 22 is fixedly disposed around the outer periphery of the pole core 7 in which the inner periphery of the stator core 22 is opposite to the outer periphery of the pole core 7 with a predetermined air gap. Specifically, the frame 4 is composed of a front frame 4A and a rear frame 4B, which are fastened to each other by a plurality of fastening bolts 43. This fastening structure fixedly supports the stator 2 in the frame 4.

Figure 2:
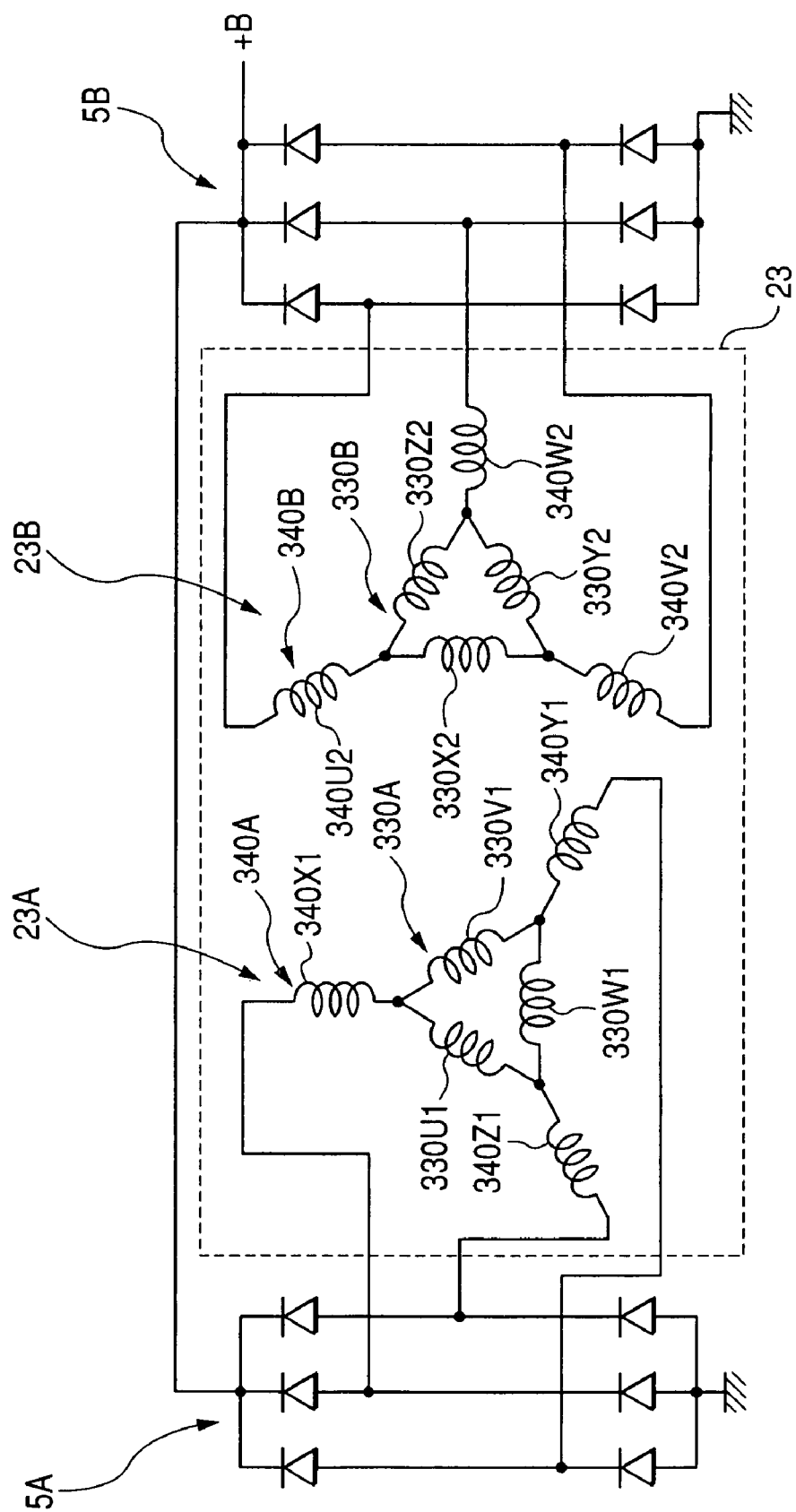
FIG. 2 is a wiring diagram of a stator coil according to the embodiment of the present invention.

As illustrated in FIG. 2, the rectifier assembly 5 includes first and second rectifiers 5A and 5B. Each of the first and second rectifiers 5A and 5B is composed of a number of, for example, six, rectifying elements, such as rectifying diodes in full-bridge configuration.

Positive output terminals of the first and second rectifiers 23A and 23B are connected to each other, and negative terminals of the first and second rectifiers 23A and 23B are connected to each other and to be grounded. The connection between the first and second rectifiers allows the first and second rectifiers 23A and 23B to serve as a parallel circuit. For example, the positive terminal of the second rectifier 23B serves as an output terminal of the alternator 1.

In addition, the first rectifier 5A is connected to three output leads extending from the first group 23A of first and second sets of three-phase windings. Similarly, the second rectifier 5B is connected to three output leads extending from the second group 23B of first and second sets of three-phase windings.

Each of the first and second rectifier assemblies 5A and 5B is configured to convert a three-phase AC (Alternating Current) voltage applied from one of the first and second groups 23A and 23B of first and second sets of three-phase windings into a DC voltage using both positive and negative half cycles of the three-phase AC voltage. The DC voltage is configured to be output from the alternator 1 via the output terminal thereof as an output voltage B.

In the alternator 1 described above, a field current is applied to the field winding 8 through the slip rings 9 and 10 and the brushes while the field winding 8 of the rotor 3 is rotating based on torque applied from the engine through the pulley 20. In this situation, the field current flowing through the field winding 8 magnetizes the claw portions of one of the circuit plates to the north (N) pole, and those of the other thereof to the south (S) pole. The rotation of the alternately magnetized north and south poles create magnetic fluxes, and the created magnetic fluxes induce a three-phase AC voltage in the stator coil 23. The induced three-phase AC voltage is full-wave rectified by the rectifier 5, thereby generating the DC voltage (output voltage B). The voltage regulator is configured to control the field current flowing through the field winding 8 in response to the alternator output voltage B.

Next, the stator 2 will be described in detail hereinafter.

Figure 3:
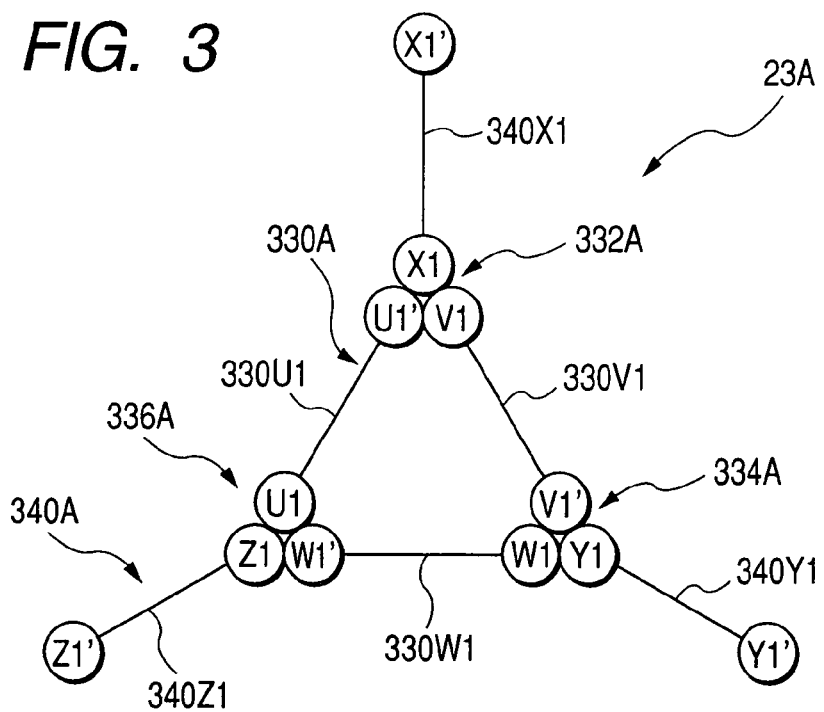
FIG. 3 is a supplementary wiring diagram of a first group of first and second sets of three-phase windings included in the stator coil.
Figure 4:
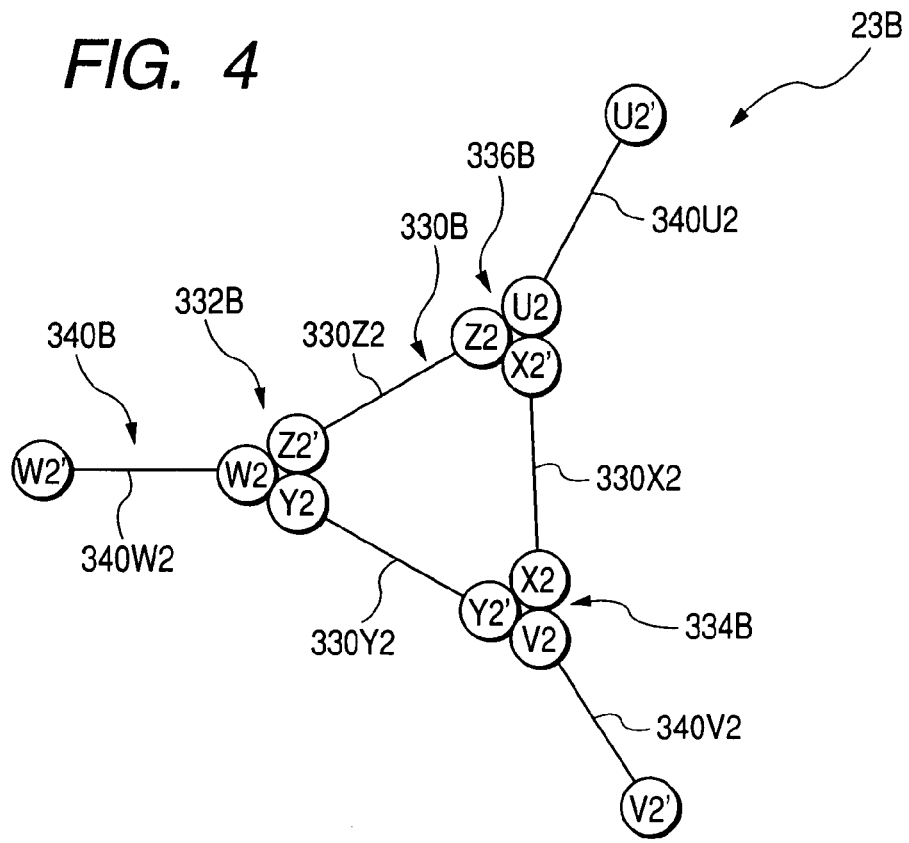
FIG. 4 is a supplementary wiring diagram of a second group of first and second sets of three-phase windings included in the stator coil.

As illustrated in FIGS. 2 to 4, the stator coil 23 of the stator 2 is composed of the first and second groups 23A and 23B of first and second sets of three-phase windings. The first group 23A consists of first and second sets 330A and 340A of three-phase windings.

The first set 330A includes a U-phase winding 330U1, a V-phase winding 330V1, and a W-phase winding 330W1 whose output ends are connected to each other in delta-configuration. The second set 340A includes an X-phase winding 340X1, a Y-phase winding 340Y1, and a Z-phase winding 340Z1 each having output and input ends. The input ends X1, Y1, and Z1 of the X-, Y-, and Z-phase windings 340X1, 340Y1, and 340Z1 of the second set 340A are respectively connected in series to the junctions (output ends) of the delta-connected U-, V-, and W-phase windings 330U1, 330V1, and 330W1 of the first set 330A. The output ends X1', Y1', and Z1' of the three-phase windings 340X1, 340Y1, and 340Z1 of the second set 340A serve respectively as output leads of the first group 23A.

The U-, V-, and W-phase winding 330U1, 330V1, and 330W1 are arranged to be shifted from each other by four slot pitches corresponding to an electric angle of $2\pi/3$ radian, and connected to each other to form the delta-connected three-phase winding 330A.

Figure 5:
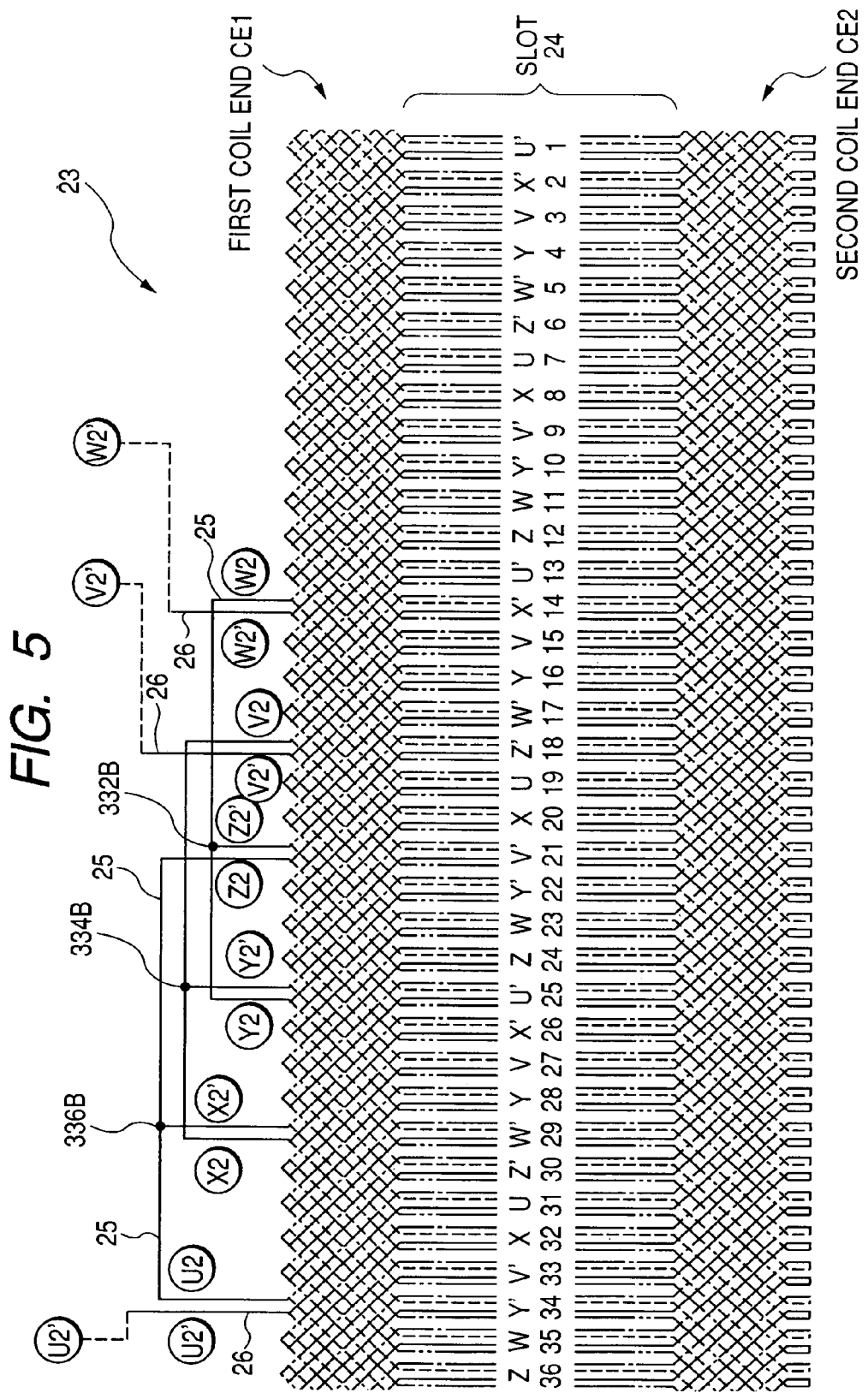
FIG. 5 is a winding diagram development of part of the stator coil according to the embodiment of the invention.
Figure 6:
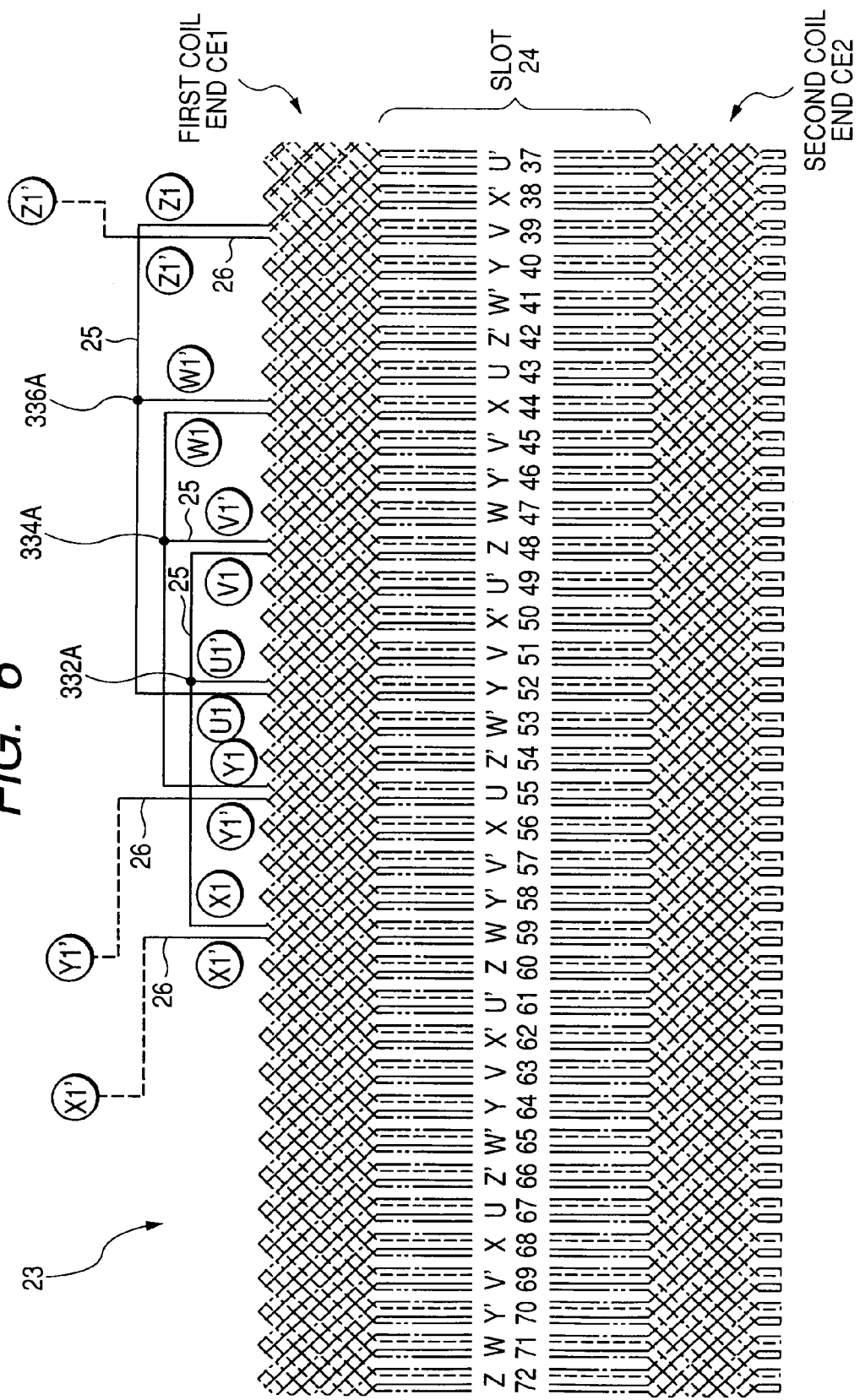
FIG. 6 is a winding diagram development of part of the stator coil according to the embodiment of the invention.
Figure 7:
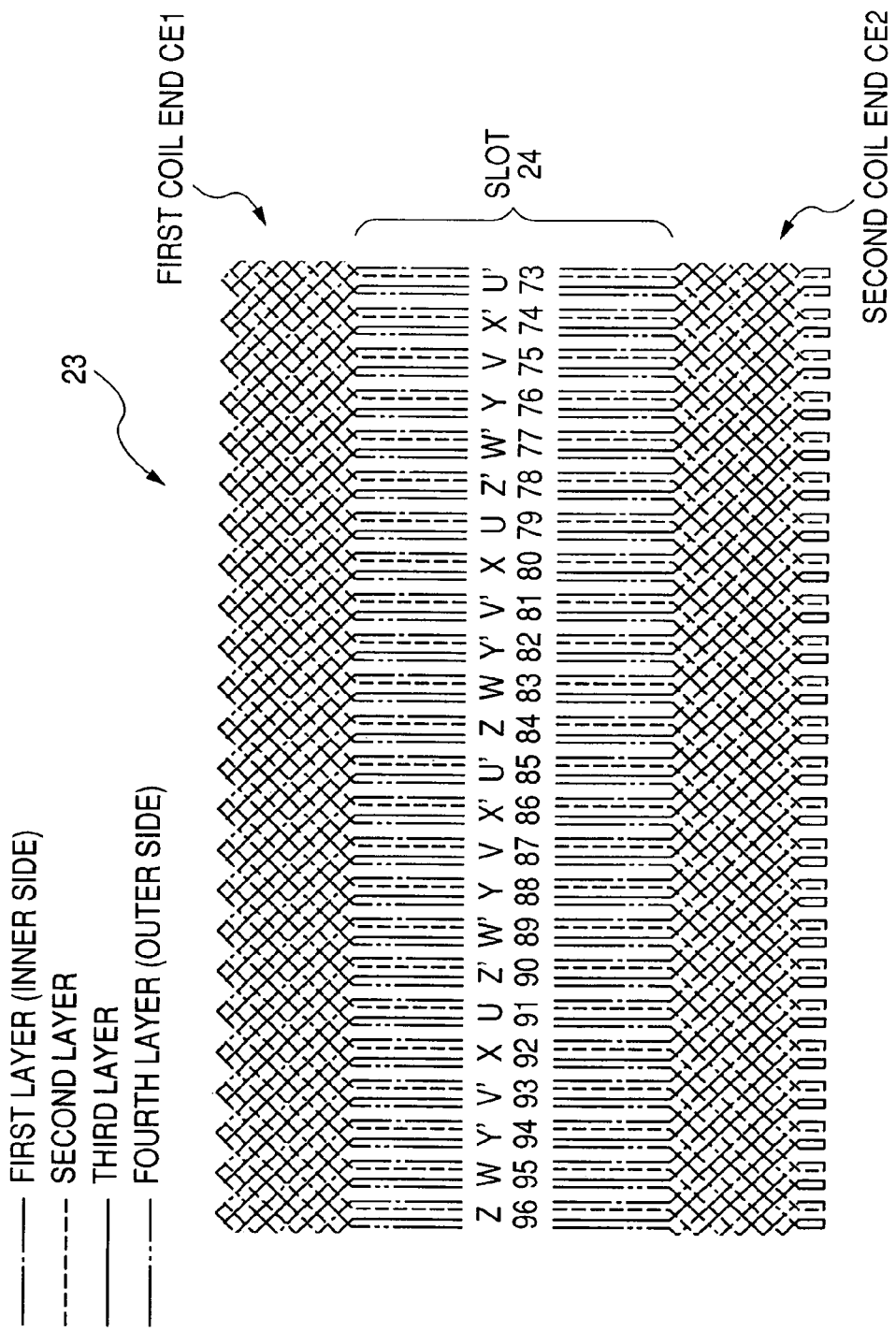
FIG. 7 is a winding diagram development of part of the stator coil according to the embodiment of the invention.

Each of the slots #1 to #96 includes a first layer to a fourth layer located from the inside to the outside of the stator core 22. In FIGS. 5 to 7, the first, second, third, and fourth layers are respectively illustrated schematically by chain, dashed, solid, and chain double-dashed lines.

Specifically, as illustrated in FIGS. 5 to. 7, the U-phase winding 330U1 is disposed in slots #55, #61, #67, . . . every six slot pitches corresponding to one pole pitch.

For example, the U-phase winding 330U1 is disposed to be sequentially inserted into the fourth layer of the slot #55, the third layer of the slot #61, the fourth layer of the slot #67, the third layer of the slot #73, the fourth layer of the slot #79, and the third layer of the slot #85.

Following the third layer of the slot #85, the U-phase winding 330U1 is disposed to be sequentially inserted in the fourth layer of the slot #91, the third layer of the slot #1, the fourth layer of the slot #7, the third layer of the slot #13, and the fourth layer of the slot #19.

Subsequent to the fourth layer of the slot #19, the U-phase winding 330U1 is disposed to be sequentially inserted in the third layer of the slot #37, the fourth layer of the slot #43, and the third layer of the slot #49.

Following the third layer of the slot #49, the U-phase winding 330U1 is disposed to be sequentially inserted into the second layer of the slot #55, the first layer of the slot #61, the second layer of the slot #67, the first layer of the slot #73, the second layer of the slot #79, and the first layer of the slot #85.

Following the first layer of the slot #85, the U-phase winding 330U1 is disposed to be sequentially inserted in the second layer of the slot #91, the first layer of the slot #1, the second layer of the slot #7, the first layer of the slot #13, and the second layer of the slot #19.

Subsequent to the second layer of the slot #19, the U-phase winding 330U1 is disposed to be sequentially inserted in the first layer of the slot #37, the second layer of the slot #43, and the first layer of the slot #49.

Specifically, the U-phase winding 330U1 is designed as a radial double-layered annular winding composed of:

a first annular layer disposed in alternately the fourth layer and the third layer of the slots 24 while it is turned at the first and second axial end surface sides of the stator core 22; and a second annular layer disposed in alternately the second layer and the first layer of the slots 24 at the radially inner side of the first annular layer while it is turned at the first and second axial end surface sides of the stator core 22.

Similarly, the V-phase winding 330V1 is inserted in slots #51, #57, #63, . . . every six slot pitches corresponding to one pole pitch; these slots #51, #57, #63, . . . are respectively shifted from slots #55, #61, #67, . . . by four slot pitches. The W-phase winding 330W1 is wound in slots #47, #53, #59, . . . every six slot pitches corresponding to one pole pitch; these slots #47, #53, #59 are respectively shifted from slots #51, #57, #63, . . . by four slot pitches.

Like the U-phase winding 330U1, the V- and W-phase windings 330V1 and 330W1 are designed as radial double-layered annular windings, respectively.

The X-, Y-, and Z-phase windings 340X1, 340Y1, and 340Z1 are arranged to be shifted from each other by four slot pitches corresponding to the electric angle of $2\pi/3$ radian.

Specifically, as illustrated in FIGS. 5 to 7, the X-phase winding 340X1 is disposed in slots #62, #68, #74, . . . every six slot pitches corresponding to one pole pitch. Similarly, the Y-phase winding 340Y1 is inserted in slots #58, #64, #70, . . . every six slot pitches corresponding to one pole pitch; these slots #58, #64, #70, . . . are respectively shifted from slots #62, #68, #74, . . . by four slot pitches. The Z-phase winding 340Z1 is wound in slots #54, #60, #66, . . . every six slot pitches corresponding to one pole pitch; these slots #54, #60, #66, . . . are respectively shifted from slots #58, #64, #70, . . . by four slot pitches.

As well as the U-, V-, and W-phase windings 330U1, 330V1 and 330W1, the X-, Y-, and Z-phase windings 340X1, 340Y1, and 340Z1 are designed as radial double-layered annular windings, respectively.

The first set 330A of the three-phase windings 330U1, 330V1, and 330W1 and the second set 340A of the three-phase windings 340X1, 340Y1, and 340Z1 are arranged to be shifted from each other by one slot pitch (the electric angle $\pi/6$).

The connection of the junctions of the delta-connected U-, V-, and W-phase windings 330U1, 330V1, and 330W1 to the input ends X1, Y1, and Z1 of the X-, Y-, and Z-phase windings 340X1, 340Y1, and 340Z1 is preferably welded to form three weld portions 332A, 334A, and 336A. This provides serial connection between the delta-connected first set 330A of three-phase windings and the second set 340A of three-phase windings. The output ends X1', Y1', and Z1' of the X-, Y-, and Z-phase windings 340X1, 340Y1, and 340Z1 are coupled to the first rectifier 5A.

The second group 23B consists of first and second sets 330B and 340B of three-phase windings.

The first set 330B includes an X-phase winding 330X2, a Y-phase winding 330Y2, and a Z-phase winding 330Z2, whose output ends are connected to each other in delta-configuration. The second set 340B includes a U-phase winding 340U2, a V-phase winding 340V2, and a W-phase winding 340W2 each having output and input ends. The input ends U2, V2, and W2 of the U-, V-, and W-phase windings 340U2, 340V2, and 340W2 of the second set 340B are respectively connected in series to the junctions (output ends) of the delta-connected X-, Y-, and Z-phase windings 330X2, 330Y2, and 330Z2 of the first set 330B. The output ends U2', V2', and W2' of the three-phase windings 340U2, 340V2, and 340W2 of the second set 340B serve respectively as output leads of the second group 23B.

The X-, Y-, and Z-phase winding 330X2, 330Y2, and 330X2 are arranged to be shifted from each other by four slot pitches corresponding to the electric angle of $2\pi/3$ radian, and connected to each other to form the delta-connected three-phase winding 330B.

Specifically, as illustrated in FIGS. 5 to 7, the X-phase winding 330X2 is disposed in slots #32, #38, #44, ... every six slot pitches corresponding to one pole pitch.

Similarly, the Y-phase winding 330Y2 is inserted in slots #28, #34, #40, ... every six slot pitches corresponding to one pole pitch; these slots #28, #34, #40, ... are respectively shifted from slots #32, #38, #44, ... by four slot pitches. The Z-phase winding 330Z2 is wound in slots #24, #30, #36, ... every six slot pitches corresponding to one pole pitch; these slots #24, #30, #36, ... are respectively shifted from slots #28, #34, #40, ... by four slot pitches.

The U-, V-, and W-phase windings 340U2, 340V2, and 340W2 are arranged to be shifted from each other by four slot pitches corresponding to the electric angle of $2\pi/3$ radian.

Specifically, as illustrated in FIGS. 5 to 7, the U-phase winding 340U2 is disposed in slots #37, #43, #49, ... every six slot pitches corresponding to one pole pitch. Similarly, the V-phase winding 340V2 is inserted in slots #33, #39, #45, ... every six slot pitches corresponding to one pole pitch; these slots #33, #39, #45 are respectively shifted from slots #37, #43, #49, ... by four slot pitches. The W-phase winding 340W2 is wound in slots #29, #35, #41, ... every six slot pitches corresponding to one pole pitch; these slots #29, #35, #41 are respectively shifted from slots #33, #39, #45, ... by four slot pitches.

For example, the W-phase winding 340W2 is disposed to be sequentially inserted into the fourth layer of the slot #17, the third layer of the slot #23, the fourth layer of the slot #29, the third layer of the slot #35, the fourth layer of the slot #41, and the third layer of the slot #47.

Following the third layer of the slot #47, the W-phase winding 340W2 is disposed to be sequentially inserted in the fourth layer of the slot #53, the third layer of the slot #59, the fourth layer of the slot #65, the third layer of the slot #71, and the fourth layer of the slot #77.

Subsequent to the fourth layer of the slot #77, the W-phase winding 340W2 is disposed to be sequentially inserted in the third layer of the slot #83, the fourth layer of the slot #89, and the third layer of the slot #95.

Following the third layer of the slot #95, the W-phase winding 340W2 is disposed to be sequentially inserted into the fourth layer of the slot #5, and the third layer of the slot #11.

Subsequent to the third layer of the slot #11, the W-phase winding 340W2 is disposed to be sequentially inserted in the second layer of the slot #17, the first layer of the slot #23, the second layer of the slot #29, the first layer of the slots #35, the second layer of the slot #41, and the first layer of the slot #47.

Following the first layer of the slot #47, the W-phase winding 340W2 is disposed to be sequentially inserted in the second layer of the slot #53, the first layer of the slot #59, the second layer of the slot #65, the first layer of the slot #71, the second layer of the slot #5, and the first layer of the slot #11.

Specifically, the W-phase winding 340W2 is designed as a radial double-layered annular winding composed of:

a first annular layer disposed in alternately the fourth layer and the third layer of the slots 24 while it is turned at the first and second axial end surface side of the stator core 22; and a second annular layer disposed in alternately the second layer and the first layer of the slots 24 at the radially inner side of the first annular layer while it is turned at the first and second axial end surface sides of the stator core 22.

As well as the W-phase winding 340W2, the X-, Y-, Z-, U-, and V-phase windings 340X2, 340Y2, 340Z2, 340U2, and 340V2 are designed as radial double-layered annular windings, respectively.

The first set 330B of the three-phase windings 330X2, 330Y2, and 330Z2 and the second set 340B of the three-phase windings 340U2, 340V2, and 340W2 are arranged to be shifted from each other by one slot pitch corresponding to the electric angle of $\pi/6$.

The connection of the junctions of the delta-connected X-, Y-, and Z-phase windings 330X2, 330Y2, and 330Z2 to the input ends U2, V2, and W2 of the U-, V-, and W-phase windings 340U2, 340V2, and 340W2 is preferably welded to form three weld portions 332B, 334B, and 336B. This provides serial connection between the delta-connected first set 330B of three-phase windings and the second set 340B of three-phase windings. The output ends U2', V2', and W2' of the U-, V-, and W-phase windings 340U2, 340V2, and 340W2 are coupled to the second rectifier 5B.

Specifically, the turn portions of the windings of each of the first and second groups 23A and 23B projecting from the first axial end surface of the stator core 22 constitute the first coil end portion CE1 of the stator coil 23. The turn portions of the windings of each of the first and second groups 23A and 23B projecting from the second axial end surface of the stator core 22 constitute the second coil end portion CE2 of the stator coil 23.

Figure 8A:
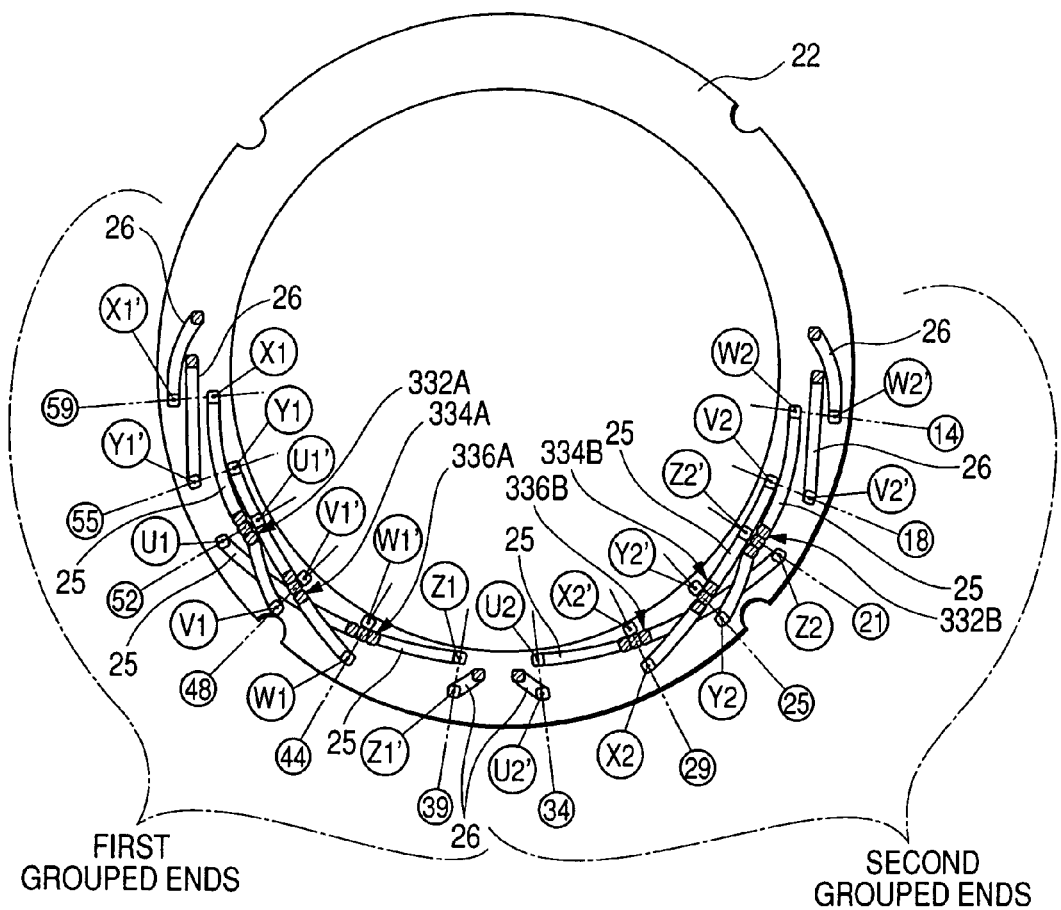
FIG. 8A is a view schematically illustrates wiring configuration of the three-phase windings of the first and second sets of the first and second groups according to the embodiment.

FIG. 8A schematically illustrates wiring configuration of the three-phase windings of the first and second sets of the first and second groups 23A and 23B.

As illustrated in FIG. 8A, circled reference characters U1 and U1' represent draw-out positions of the ends of the U-phase winding 330U1 from the first coil end portion side of the stator core 22. Specifically, as illustrated in FIG. 6, connection leads 25 (circled reference characters U1 and U1' in FIG. 6) are drawn out from the fourth layer of the slot #55 and from the first layer of the slot #49 of the U-phase winding 330U1. That is, the circled reference characters U1 and U1' in FIG. 8A correspond to the ends of the U-phase winding 330U1.

Similarly, circled reference characters V1 and V1' represent draw-out positions of the ends of the V-phase winding 330V1 from the first coil end portion side of the stator core 22. Specifically, as illustrated in FIG. 6, connection leads 25

(circled reference characters V1 and V1' in FIG. 6) are drawn out from the fourth layer of the slot #51 and from the first layer of the slot #45 of the V-phase winding 330V1. That is, the circled reference characters V1 and V1' in FIG. 8A correspond to the ends of the V-phase winding 330V1.

Circled reference characters W1 and W1' represent draw-out positions of the ends of the W-phase winding 330W1 from the first coil end portion side of the stator core 22. Specifically, as illustrated in FIG. 6, connection leads 25 (circled reference characters W1 and W1' in FIG. 6) are drawn out from the fourth layer of the slot #47 and from the first layer of the slot #41 of the W-phase winding 330W1. That is, the circled reference characters W1 and W1' in FIG. 8A correspond to the ends of the W-phase winding 330W1.

Circled reference characters X1 and X1' represent draw-out positions of the ends of the X-phase winding 340X1 from the first coil end portion side of the stator core 22. Connection and output leads 25 and 26 (circled reference characters X1 and X1' in FIG. 6) are drawn out from the first layer of the slot #56 and from the fourth layer of the slot #62 of the X-phase winding 340X1. That is, the circled reference characters X1 and X1' correspond to the ends of the X-phase winding 340X1.

Similarly, circled reference characters Y1 and Y1' represent draw-out positions of the ends of the Y-phase winding 340Y1 from the first coil end portion side of the stator core 22. Connection and output leads 25 and 26 (circled reference characters Y1 and Y1' in FIG. 6) are drawn out from the first layer of the slot #52 and from the fourth layer of the slot #58 of the Y-phase winding 340Y1.

Circled reference characters Z1 and Z1' represent draw-out positions of the ends of the Z-phase winding 340Z1 from the first coil end portion side of the stator core 22. Connection and output leads 25 and 26 (circled reference characters Z1 and Z1' in FIG. 6) are drawn out from the first layer of the slot #36 and from the fourth layer of the slot #42 of the Z-phase winding 340Z1.

Like the first group 23A, circled reference characters U2 and U2' represent draw-out positions of the ends of the U-phase winding 340U2 from the first coil end portion side of the stator core 22. Specifically, as illustrated in FIG. 6, connection and output leads 25 and 26 (circled reference characters U2 and U2' in FIG. 6) are drawn out from the first layer of the slot #31 and from the fourth layer of the slot #37 of the U-phase winding 340U2. That is, the circled reference characters U2 and U2' in FIG. 8A correspond to the ends of the U-phase winding 340U2.

Similarly, circled reference characters V2 and V2' represent draw-out positions of the ends of the V-phase winding 340V2 from the first coil end portion side of the stator core 22. Specifically, as illustrated in FIG. 6, connection and output leads 25 and 26 (circled reference characters V2 and V2' in FIG. 6) are drawn out from the first layer of the slot #15 and from the fourth layer of the slot #21 of the V-phase winding 340V2. That is, the circled reference characters V2 and V2' in FIG. 8A correspond to the ends of the V-phase winding 340V2.

Circled reference characters W2 and W2' represent draw-out positions of the ends of the W-phase winding 340W2 from the first coil end portion side of the stator core 22. Specifically, as illustrated in FIG. 6, connection and output leads 25 and 26 (circled reference characters W2 and W2' in FIG. 6) are drawn out from the first layer of the slot #11 and from the fourth layer of the slot #17 of the W-phase winding 340W2. That is, the circled reference characters W2 and W2' in FIG. 8A correspond to the ends of the W-phase winding 340W2.

Circled reference characters X2 and X2' represent draw-out positions of the ends of the X-phase winding 340X2 from the first coil end portion side of the stator core 22. Specifically, as illustrated in FIG. 6, connection leads 25 (circled reference characters X2 and X2' in FIG. 6) are drawn out from the fourth layer of the slot #32 and from the first layer of the slot #26 of the X-phase winding 340X2. That is, the circled reference characters X2 and X2' in FIG. 8A correspond to the ends of the X-phase winding 340X2.

Similarly, circled reference characters Y2 and Y2' represent draw-out positions of the ends of the Y-phase winding 340Y2 from the first coil end portion side of the stator core 22. Specifically, as illustrated in FIG. 6, connection leads 25 (circled reference characters Y2 and Y2' in FIG. 6) are drawn out from the fourth layer of the slot #28 and from the first layer of the slot #22 of the Y-phase winding 340Y2. That is, the circled reference characters Y2 and Y2' in FIG. 8A correspond to the ends of the Y-phase winding 340Y2.

Circled reference characters Z2 and Z2' represent draw-out positions of the ends of the Z-phase winding 340Z2 from the first coil end portion side of the stator core 22. Specifically, as illustrated in FIG. 6, connection leads 25 (circled reference characters Z2 and Z2' in FIG. 6) are drawn out from the fourth layer of the slot #24 and from the first layer of the slot #18 of the Z-phase winding 340Z2. That is, the circled reference characters Z2 and Z2' in FIG. 8A correspond to the ends of the Z-phase winding 340Z2.

Note that the specification will describe the draw-out positions from the first coil end portion side of the stator coil 23, which are represented by X1 and X1' and the like, as the positions of both ends of corresponding windings. In addition, circled reference numerals illustrated in FIG. 8A represent circumferential positions of both ends of each included in the first and second groups 23A and 23B, which are related to the slot numbers of the slots 24 illustrated in FIGS. 5 to 7.

For example, FIGS. 6 and 8A clearly show that the ends X1 and X1' of the X-phase winding 340X1 are drawn out from the first coil end portion side of the stator core 22 at the circumferential position identical with that of the slot #59. Note that a portion of the X-phase winding 340X1 from which the end X1 extends is actually inserted in the slot #56 shifted counterclockwise from the slot #59 by three slots. In addition, a portion of the X-phase winding 340X1 from which the end X1' extends is actually inserted in the slot #62 shifted clockwise from the slot #59 by three slots. This can be established in the ends of each of the remaining windings.

In the embodiment, as illustrated in FIG. 8A, the first grouped ends U1, U1', V1, V1', W1, W1', X1, X1', Y1, Y1', Z1, and Z1' of the windings of the first and second sets 330A and 340A included in the first group 23A and the second grouped ends U2, U2', V2, V2', W2, W2', X2, X2', Y2, Y2', Z2, and Z2' of the windings of the first and second sets 330B and 340B included in the second group 23B are so arranged that the first grouped ends are separated from the second grouped ends in a circumferential direction of the stator core 22.

In other words, the first grouped ends of the windings of the first and second sets 330A and 340A included in the first group 23A and the second grouped ends of the windings of the first and second sets 330B and 340B included in the second group 23B are disposed not to be overlapped to each other in a circumferential direction of the stator core 22.

Moreover, when focusing on the first group 23A, the circumferential positions of the ends U1, U1', V1, V1', W1, and W1' included in the first set 330A are circumferentially arranged between the ends X1, X1', Y1, and Y1' of the windings included in the second 340A and the ends Z1 and Z1' of the windings included therein (see FIGS. 6 and 8A).

Figure 8B:
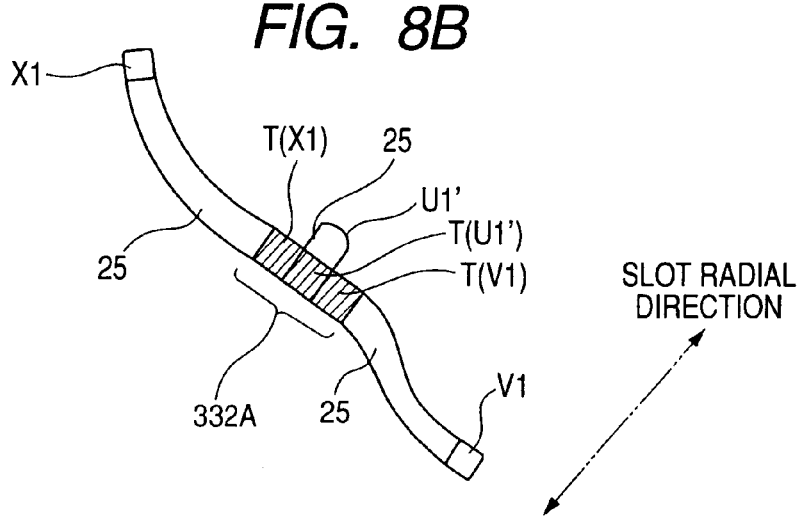
FIG. 8B is an enlarged view of a weld portion of the first group according to the embodiment.

In addition, the tip ends X1, U1', and V1 of the windings 340X1, 330U1, and 330V1 are respectively drawn out by the corresponding connection leads 25 to be bundled together in a group so that the bundled tip ends, which are respectively expressed by T(X1), T(U1'), and T(V1), of the windings 340X1, 330U1, and 330V1 are welded to form the weld portion 332A (see FIG. 8B).

Similarly, the tip ends Y1, V1', and W1 of the windings 340Y1, 330V1, and 330W1 are respectively drawn out by the corresponding connection leads 25 to be bundled together in a group so that the bundled tip ends Y1, V1', and W1 of the windings 340Y1, 330V1, and 330W1 are welded to form the weld portion 334A. Moreover, the tip ends U1, W1', and Z1 of the windings 330U1, 330W1, and 340Z1 are respectively drawn out by the corresponding connection leads 25 to be bundled together in a group so that the bundled tip ends U1, W1', and Z1 of the windings 330U1, 330W1, and 340Z1 are welded to form the weld portion 336A.

The weld portions 332A, 334A, and 336A of the tip ends (X1, U1', V1), (Y1, V1', W1), and (U1, W1', Z1) are circumferentially arranged to be separated from the remaining tip ends (X1', Y1', Z1') and the corresponding leads 25 drawn out from the tip ends (X1', Y1', Z1'). In addition, the weld portions 332A, 334A, and 336A of the tip ends (X1, U1', V1), (Y1, V1', W1), and (U1, W1', Z1) are locally arranged in a circumferential direction of the stator core 22 over radially middle portions of corresponding slots 24.

Moreover, as illustrated in FIG. 8A, the tip ends of the windings, which form each of the weld portions 332A, 334A, and 336A, are circumferentially aligned and arranged over the radially middle portions of the corresponding slots 24.

Furthermore, the tip end of the winding disposed at the middle of the ends of the windings forming each of the weld portions extends in the axial direction of the stator core 22.

For example, when focusing on the weld portion 332A, as illustrated in FIGS. 8A and 8B, the bundled tip ends T(X1), T(U1'), and T(V1) of the windings 340X1, 330U1, and 330V1, which form the weld portion 332A, are circumferentially aligned and arranged over the radially middle portions of the corresponding adjacent slots 24.

Furthermore, as illustrated in FIGS. 6, 8A, and 8B, the tip end T(U1') (connection lead 25) of the winding 330U1 disposed at the middle of the tip ends T(X1), T(U1'), and T(V1) of the weld portion 332A extends in the axial direction of the core 22 without extending any circumferential directions. The arrangement features of the weld portion 332A can be established in the remaining weld portions 334A and 336A.

In addition, the weld portions 332A, 334A, and 336A are aligned in the circumferential direction of the core 22.

Moreover, one ends (leads) of the windings drawn out from the corresponding slots 24 for one of the weld portions 332A, 334A, and 336A are arranged to minimize the number of intersections between the one ends of the drawn-out windings and one ends of the windings drawn out from the corresponding slots 24 for another one of the weld portions 332A, 334A, and 336A; this one of the weld portions 332A, 334A, and 336A is disposed forwardly in a predetermined circumferential direction from another one of the weld portions 332A, 334A, and 336A.

For example, it is assumed that, in FIG. 8A, the predetermined circumferential direction is the counterclockwise direction.

In this assumption, the end V1 (lead 25) of the winding 330V1 drawn out from the corresponding one of the slots 24 for the weld portion 332A disposed backward in the counterclockwise direction from the weld portion 336A is disposed to intersect with the end U1 (lead 25) of the winding 330U1 drawn out from the corresponding one of the slots 24 for the weld portion 336A such that the end V1 of the winding 330V1 jumps over the end U1 of the winding 330U1.

However, the remaining ends U1' and X1 drawn out from the corresponding slots 24 for the weld portion 332A are disposed not to intersect with the remaining ends drawn out from the corresponding slots 24 for the other weld portions 334A and 336A.

In addition, as illustrated in FIG. 8A, the end W1 (lead 25) of the winding 330W1 drawn out from the corresponding one of the slots 24 for the weld portion 334A disposed backward in the counterclockwise direction from the weld portion 336A is disposed to intersect with the end U1 (lead 25) of the winding 330U1 drawn out from the corresponding one of the slots 24 for the weld portion 336A such that the end W1 of the winding 330W1 jumps over the end U1 of the winding 330U1.

However, the remaining ends V1' and W1 drawn out from the corresponding slots 24 for the weld portion 334A are disposed not to intersect with the remaining ends drawn out from the corresponding slots 24 for the other weld portions 332A and 336A.

Similarly, when focusing on the second group 23B, the circumferential positions of the ends X2, X2', Y2, Y2', Z2, and Z2' included in the first set 330B are arranged circumferentially between the ends W2, W2', V2, and V2' of the windings included in the second set 340B and the ends U2 and U2' of the windings included therein (see FIGS. 5 and 8A).

In addition, the tip ends W2, Z2', and Y2 of the windings 340W2, 330Z2, and 330Y2 are respectively drawn out by the corresponding connection leads 25 to be bundled together in a group so that the bundled tip ends W2, Z2', and Y2 of the windings 340W2, 330Z2, and 330Y2 are welded to form the weld portion 332B.

Similarly, the tip ends V2, Y2', and X2 of the windings 340V2, 330Y2, and 330X2 are respectively drawn out by the corresponding connection leads 25 to be bundled together in a group so that the bundled ends V2, Y2', and X2 of the windings 340V2, 330Y2, and 330X2 are welded to form the weld portion 334B. Moreover, the tip ends Z2, X2', and U2 of the windings 330Z2, 330X2, and 340U2 are respectively drawn out by the corresponding connection leads 25 to be bundled together in a group so that the bundled tip ends Z2, X2', and U2 of the windings 330Z2, 330X2, and 340U2 are welded to form the weld portion 336B.

The weld portions 332B, 334B, and 336B of the tip ends (W2, Z2', Y2), (V2, Y2', X2), and (Z2, X2', U2) are circumferentially arranged to be separated from the remaining tip ends (W2', V2', U2') and the corresponding connection leads 25 drawn out from the ends (W2', V2', U2'). In addition, the weld portions 332B, 334B, and 336B of the tip ends (W2, Z2', Y2), (V2, Y2', X2), and (Z2, X2', U2) are locally arranged in a circumferential direction of the stator core 22 over radially middle portions of corresponding slots 24.

Moreover, as illustrated in FIG. 8A, the tip ends of the windings, which form each of the weld portions 332B, 334B, and 336B, are circumferentially aligned and arranged over the radially middle portions of the corresponding slots 24.

Furthermore, the tip end of the winding disposed at the middle of the tip ends of the windings forming each of the weld portions in the axial direction of the core 22.

For example, as well as the weld portion 332A illustrated in FIG. 8B, when focusing on the weld portion 332B, as illustrated in FIG. 8A, the tip ends W2, Z2', and Y2 of the windings 340W2, 330Z2, and 330Y2, which form the weld portion 332B, are circumferentially aligned and arranged over the radially middle portions of the corresponding slots 24.

Furthermore, as illustrated in FIGS. 5 and 8A, the end Z2' (connection lead 25) of the winding 330Z2 disposed at the middle of the ends W2, Z2', and Y2 of the weld portion 332B extends in the axial direction of the core 22 without extending any circumferential directions, which is similar to the weld portion 332A illustrated in FIG. 8B. The arrangement features of the weld portion 332B can be established in the remaining weld portions 334B and 336B.

In addition, the weld portions 332B, 334B, and 336B are aligned in the circumferential direction of the core 22.

Moreover, one ends (leads) of the windings drawn out from the corresponding slots 24 for one of the weld portions 332B, 334B, and 336B are arranged to minimize the number of intersections between the one ends of the drawn-out windings and one ends of the windings drawn out from the corresponding slots 24 for another one of the weld portions 332B, 334B, and 336B; this one of the weld portions 332B, 334B, and 336B is disposed forwardly in a predetermined circumferential direction from another one of the weld portions 332B, 334B, and 336B.

For example, it is assumed that, in FIG. 8A, the predetermined circumferential direction is the clockwise direction.

In this assumption, the end Y2 (lead 25) of the winding 330Y2 drawn out from the corresponding one of the slots 24 for the weld portion 332B disposed backward in the clockwise direction from the weld portion 336B is disposed to intersect with the end Z2 (lead 25) of the winding 330Z2 drawn out from the corresponding one of the slots 24 for the weld portion 336B such that the end Y2 of the winding 330Y2 jumps over the end Z2 of the winding 330Z2.

However, the remaining ends Z2' and W2 drawn out from the corresponding slots 24 for the weld portion 332B are disposed not to intersect with the remaining ends drawn out from the corresponding slots 24 for the other weld portions 334B and 336B.

In addition, as illustrated in FIG. 8A, the end X2 (lead 25) of the winding 330X2 drawn out from the corresponding one of the slots 24 for the weld portion 334B disposed backward in the clockwise direction from the weld portion 336B is disposed to intersect with the end Z2 (lead 25) of the winding 330Z2 drawn out from the corresponding one of the slots 24 for the weld portion 336B such that the end X2 of the winding 330X2 jumps over the end Z2 of the winding 330Z2.

However, the remaining ends Y2' and V2 drawn out from the corresponding slots 24 for the weld portion 334B are disposed not to intersect with the remaining ends drawn out from the corresponding slots 24 for the other weld portions 332B and 336B.

In the embodiment, each of the three-phase windings included in the first and second groups 23A and 23B is made up of sequentially joined conductor segments each with a substantially U shaped (V-shaped) turn portion as illustrated in FIGS. 9 to 13.

Specifically, as described above, the sequentially joined conductor segments provide each of the radial double-layered annular windings in each of the first and second groups 23A and 23B.

Figure 9:
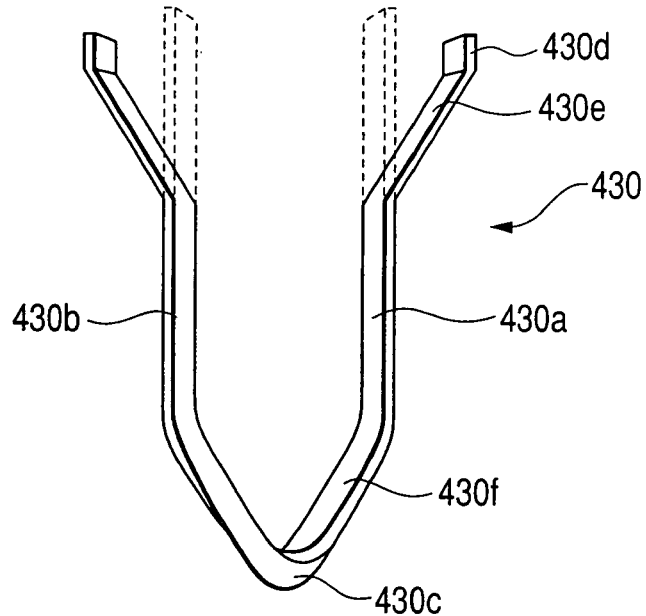
FIG. 9 is an enlarged perspective view of a conductor segment constituting each of the three-phase windings of each of the first and second groups according to the embodiment.
Figure 12:
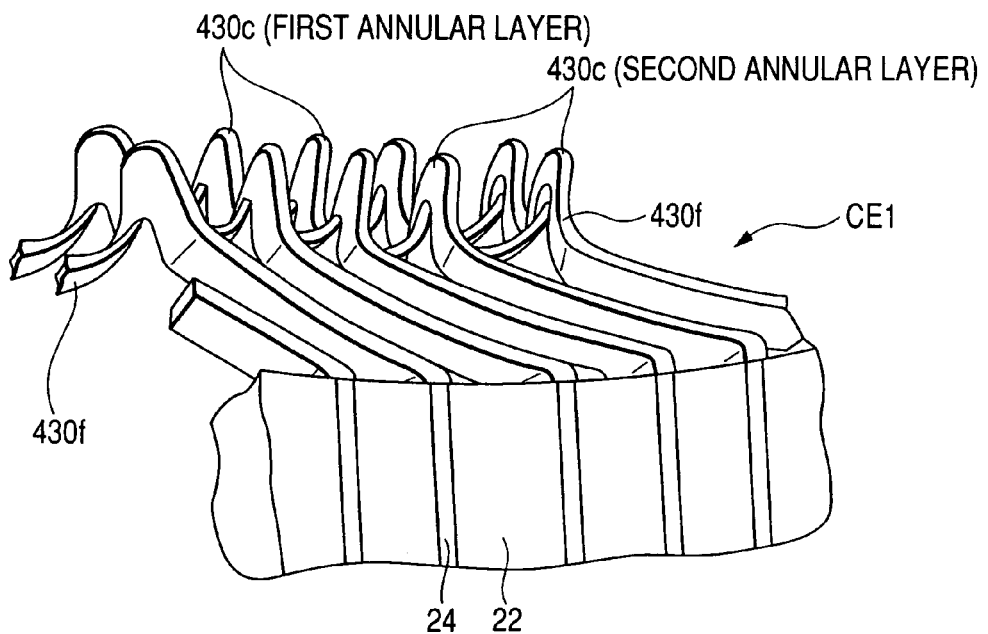
FIG. 12 is a perspective view schematically illustrating a first coil end portion of the stator coil according to the embodiment.

As illustrated in FIGS. 9 and 12, each of the conductor segments 430 has a substantially long plate-like U shape, and is covered with an insulation film, such as a resinous film, except for tip ends 430d thereof.

For example, each of the conductor segments 430 is formed from a conductor plate, such as a copper plate, by a press machine into a U-shape.

Specifically, each of the conductor segments 430 is composed of a pair of straight conductor portions 430a and 430b, and a U-shaped turn portion 430c such that the paired straight conductor portions extending at their one ends from ends of the turn portion 430c; these straight conductor portions 430a and 430b are to be inserted into the slots 35. These straight conductor portions 430a and 430b will also be referred to as slot-inserted conductor portions hereinafter.

Each of the conductor segments 430 is also composed of projecting end portions 430e continuing from the other ends of the straight conductor portions and projecting outside the slots 24 when the straight conductor portions are placed within the slots 24.

The turn portion 430c of each of the conductor segments 430 connects both the one ends of the paired straight conductor portions 430a and 430b of each of the conductor segments 430.

The projecting end portions 430e are bent to be inclined outward with a predetermined electric angle with respect to the axial direction of the corresponding slots 24.

The turn portion 430c of each of the conductor segments 430 is composed of a tip portion and a pair of slant portions 430f. The paired slant portions 430f are designed to continue from both ends of the tip portion, slant with a predetermined electric angle with respect to the axial direction of the corresponding slots 24, and lead to the straight conductor portions 430a and 430b, respectively.

How to provide each of the radial double-layered annular windings in each of the first and second groups 23A and 23B using the conductor segments 430 will be described hereinafter.

Figure 10:
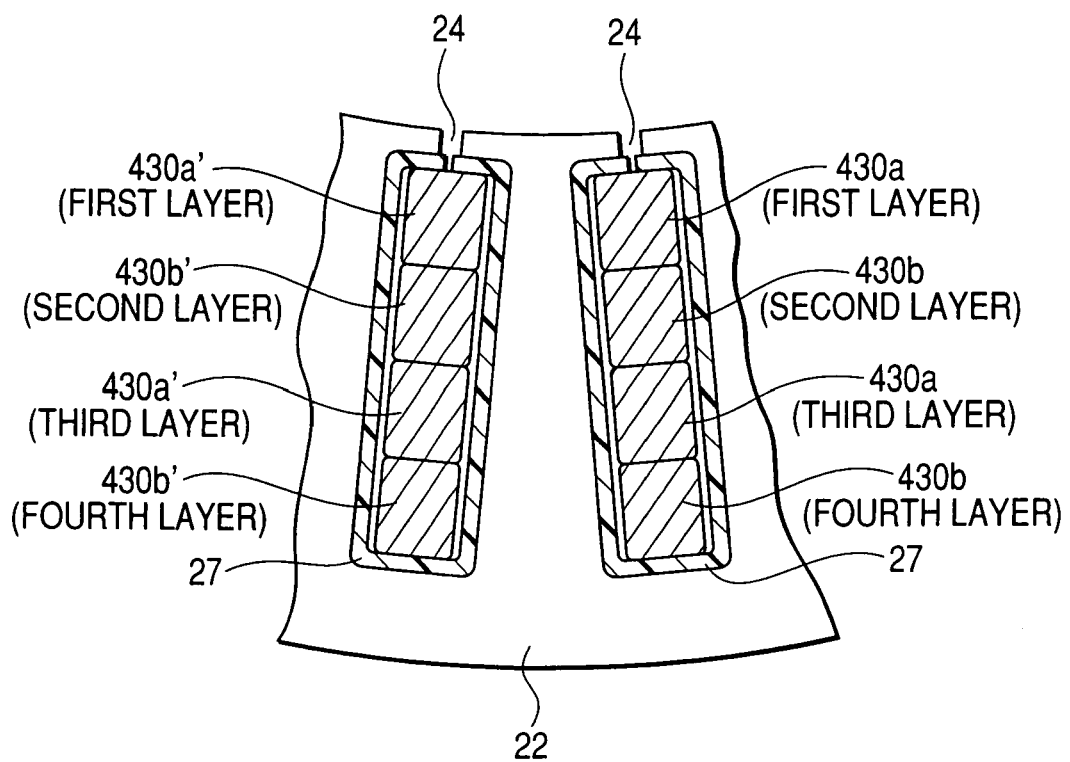
FIG. 10 is a partially cross sectional enlarged view schematically illustrating part of the stator according to the embodiment.
Figure 11:
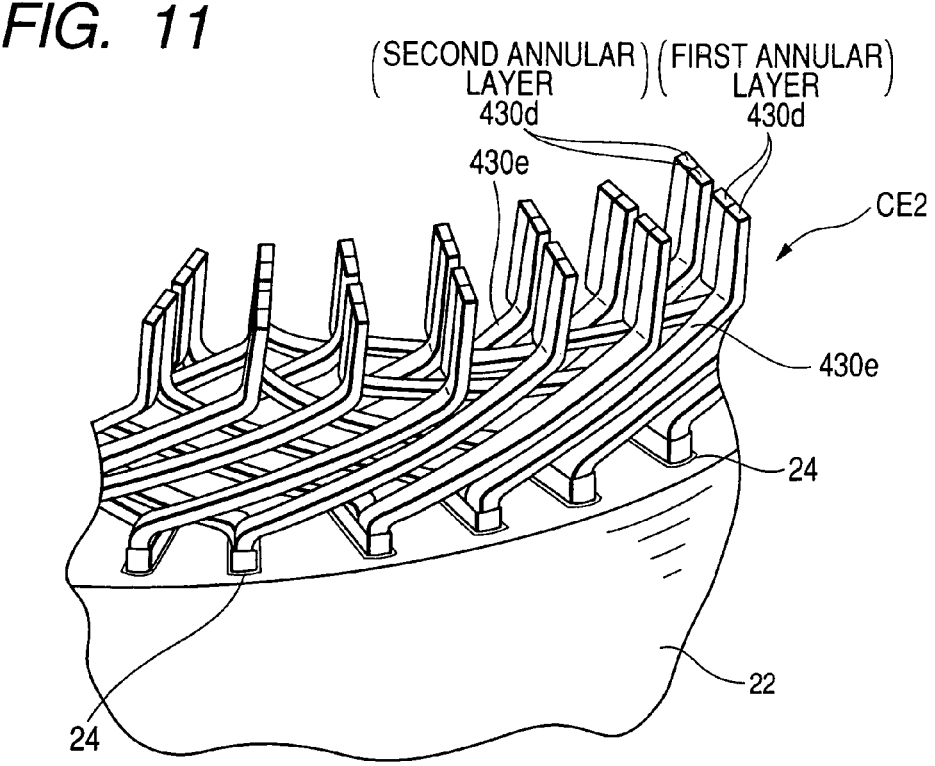
FIG. 11 is a perspective view schematically illustrating a second coil end portion of the stator coil according to the embodiment.
Figure 13:
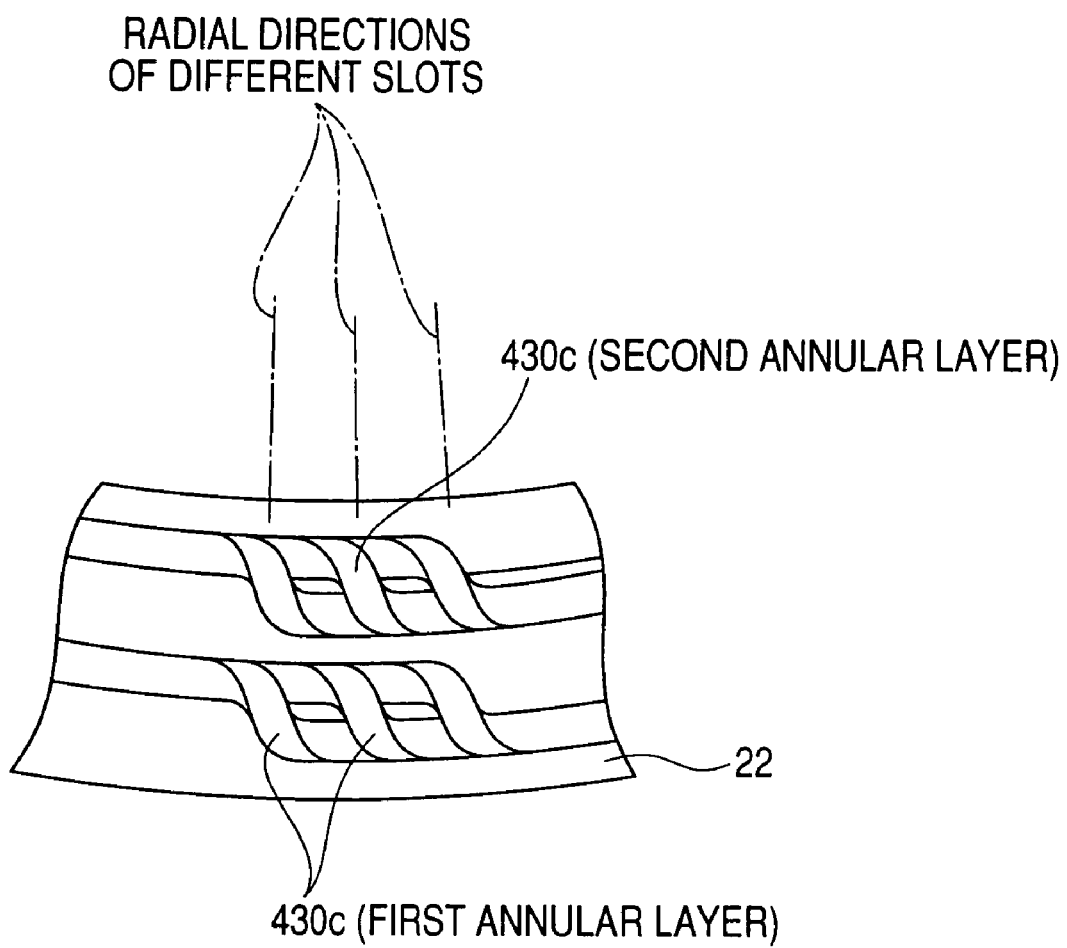
FIG. 13 is a view schematically illustrating the first coil end portion of the stator coil in an axial direction of the stator core according to the embodiment.

Take, for example, the U-phase winding 330U1, conductor segments 430 are disposed in the stator core 22 such that:

the straight conductor portions 430b are inserted in the fourth layers of the corresponding slots #55, #67, #79, . . . , #43 (see FIG. 10);

the straight conductor portions 430a are inserted in the third layers of the corresponding slots #61, #73, #85, . . . , #49 (see FIG. 10); and the turn portions 430c are arranged to project from the first axial end surface side of the stator core 22 (see FIGS. 12 and 13).

The projecting end portions 430e projecting from the second axial end surface side of the stator core 22 when the straight conductor portions 430a and 430b are placed within the corresponding slots 24 are bent to be inclined outward with a predetermined electric angle with respect to the axial directions of the corresponding slots 24. A tip end 430d of a projecting end portion 430e continuing from a straight conductor portion 430a disposed in the fourth layer of a slot 24 is welded to that of another projecting end portion 430e continuing from a straight conductor portion 430b disposed in the third layer of another slot 24 (see FIG. 11).

For example, a tip end 430d of a projecting end portion 430e continuing from a straight conductor portion 430a disposed in the fourth layer of the slot #55 is welded to that of another projecting end portion 430e continuing from a straight conductor portion 430b disposed in the third layer of the slot #61.

These conductor segments 430 provide the first annular layer of the U-phase winding 330U1.

Moreover, conductor segments 430 are disposed in the stator core 22 such that:

the straight conductor portions 430b are inserted in the second layers of the corresponding slots #55, #67, . . . , #43 (see FIG. 10);

the straight conductor portions 430a are inserted in the first layers of the corresponding slots #61, #73, ..., #49 (see FIG. 10); and the turn portions 430c are arranged to project from the first axial end surface side of the stator core 22 (see FIGS. 12 and 13).

The projecting end portions 430e projecting from the second axial end surface side of the stator core 22 when the straight conductor portions 430a and 430b are placed within the corresponding slots 24 are bent to be inclined outward with a predetermined electric angle with respect to the axial directions of the corresponding slots 24. A tip end 430d of a projecting end portion 430e continuing from a straight conductor portion 430a disposed in the second layer of a slot 24 is welded to that of another projecting end portion 430e continuing from a straight conductor portion 430b disposed in the first layer of another slot 24 (see FIG. 11).

For example, a tip end 430d of a projecting end portion 430e continuing from a straight conductor portion 430a disposed in the second layer of the slot #55 is welded to that of another projecting end portion 430e continuing from a straight conductor portion 430b disposed in the first layer of the slot #61.

These conductor segments 430 provide the second annular layer of the U-phase winding 330U1.

A tip end 430d of a projecting end portion 430e continuing from a straight conductor portion 430a disposed in the second layer of the slot #55 is welded to that of another projecting end portion 430e continuing from a straight conductor portion 430b disposed in the third layer of the slot #49. This allows the first and second annular layers to be joined to each other, providing the first annular layer of the U-phase winding 330U1.

The remaining V-, W-, X-, Y-, and Z-phase windings 330V1, 330W1, 340X1, 340Y1, and 340Z1 of the first group 23A and the X-, Y-, Z-, U-, V-, and W-phase windings 330X2, 330Y2, 330Z2, 340U2, 340V2, and 340W2 of the second group 23B can be individually constructed using the conductor segments 430 as in the case of the U-phase winding 330U1.

It is to be noted that, in FIG. 10, each reference number with no dash and that with a dash (') are assigned to the identical portions of different conductor segments 430. The straight conductor portions 430b or 430b' in the fourth and second layers of a same one slot 24 constitute one-phase winding (one radial double-layered annular winding) of one of the first and second groups 23A and 23B. Similarly, the straight conductor portions 430a or 430a' in the third and first layers of a same one slot 24 constitute one-phase winding (one radial double-layered annular winding) of one of the first and second groups 23A and 23B.

In the embodiment, as illustrated in FIGS. 12 and 13, the turn portions 430c of the first annular layers of the three-phase windings of the first and second groups 23A and 23B and those of the second annular layers of the corresponding three-phase windings are radially arranged with each other over the corresponding slots 24.

In other words, the turn portions 430c of the first annular layers of the three-phase windings of the first and second groups 23A and 23B and those of the second annular layers of the corresponding three-phase windings are arranged such that they are not axially overlapped with each other.

Figure 14A:
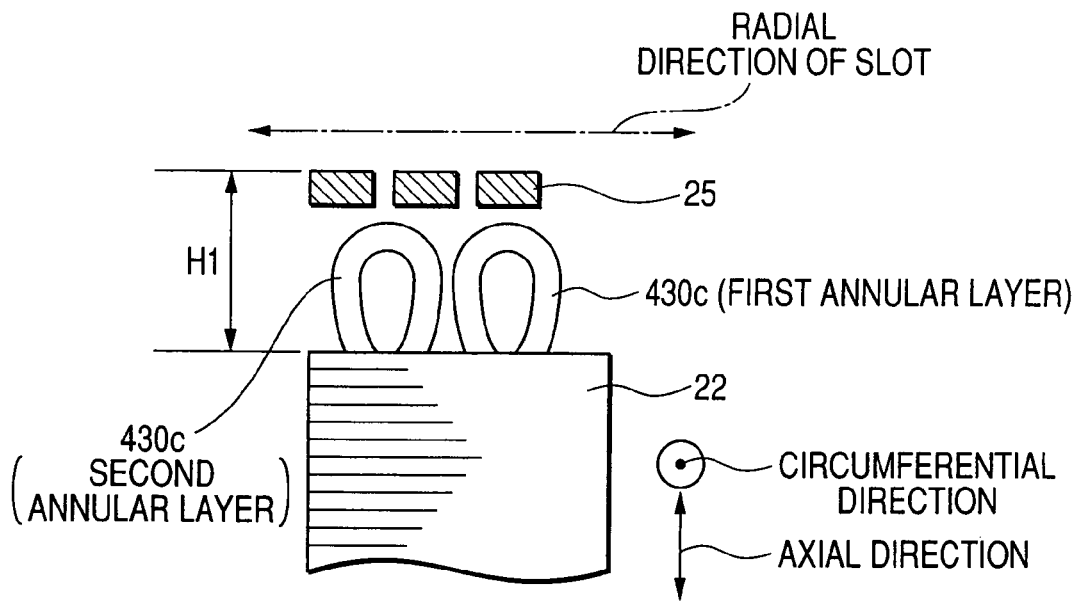
FIG. 14A is an enlarged view schematically illustrating radially arranged turn portions of same-shaped conductor segments corresponding to first and second annular layers of a three-phase winding of one of the first and second groups of the stator coil according to the embodiment of the present invention as viewed along a circumferential direction of the stator core.

FIG. 14A schematically illustrates radially arranged turn portions 430c of same-shaped conductor segments 430 corresponding to the first and second annular layers of a three-phase winding of one of the first and second groups 23A and 23B of the stator coil 23 according to the embodiment as viewed along a circumferential direction of the stator core 22.

Figure 14B:
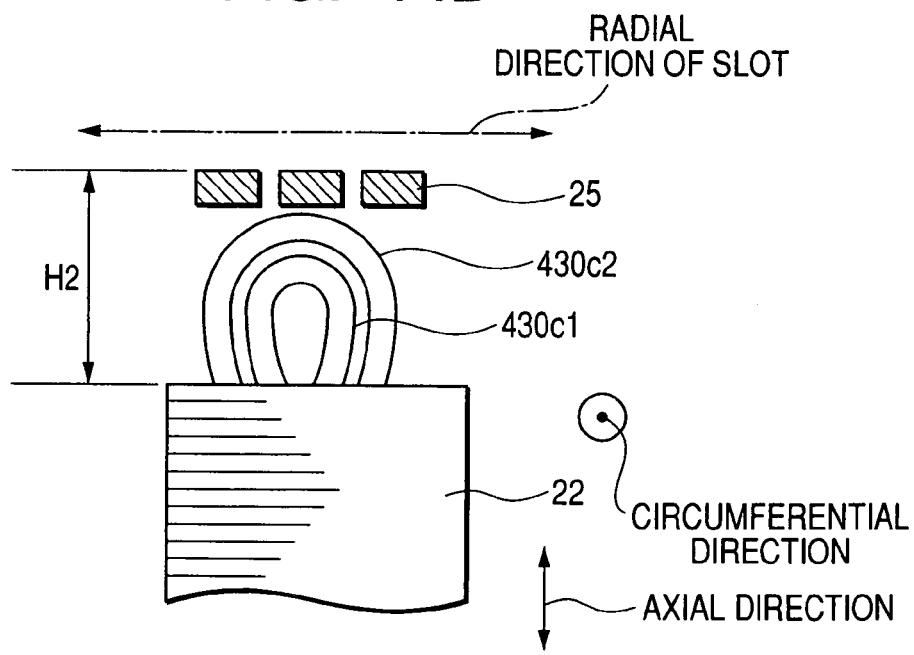
FIG. 14B is an enlarged view schematically illustrating a pair of turn portions of small and large conductor segments of a three-phase winding of one of first and second groups of a stator coil according to a comparative example of the conventional embodiment as viewed along a circumferential direction of the stator core.

As a comparative example of the embodiment, FIG. 14B schematically illustrates a pair of turn portions 430c1 and 430c2 of small and large conductor segments of a three-phase winding of one of first and second groups of a stator coil as viewed along a circumferential direction of the stator core 22.

Specifically, as illustrated in FIG. 14B, in the comparative example of the conventional embodiment, the turn portion 430c2 of the large conductor segment is arranged to cover the turn portion 430c1 of the small conductor segment. This provides an axial double-layered annular winding.

Note that, in order to reduce the size of a stator coil (a stator), it is necessary to reduce the axial length of a stator coil as much as possible.

However, assuming that the size and shape of a conductor segment 430 according to the embodiment are substantially identical to those of a small-sized conductor segment according to the comparative example, the axial length of a large-sized conductor segment in the axial direction thereof is larger than that of a conductor segment 430 according to the embodiment. This may cause the axial length of the stator coil according to the comparative example to increase.

In addition, as illustrated in FIGS. 5, 6, and 14B, because connection leads are arranged to be axially higher than the axial end of a large-sized conductor segment. For this reason, the axial length (height) H2 of the stator coil from the stator core 22 according to the comparative example containing the axial length (height) of each of the individual connection leads 25 may more increase.

In contrast, in the embodiment, as described above and illustrated in FIGS. 13 and 14A, the turn portions 430c of the first annular layers of the three-phase windings of the first and second groups 23A and 23B and those of the second annular layers of the corresponding three-phase windings are radially arranged with each other over the corresponding slots 24.

For this reason, it is possible to reduce the axial length (height) H1 of the stator coil 23 from the stator core 22 according to the embodiment containing the axial length (height) of each of the individual connection leads 25 as compared with the axial length (height) H2 of the stator coil from the stator core 22 according to the comparative example.

The turn portions 430c of the windings of each of the first and second groups 23A and 23B projecting from the first axial end surface of the stator core 22 constitute the first coil end portion CE1 of the stator coil 23. For this reason, the alternator 1 according to the embodiment allows the axial height of the first coil end portion CE1 of the stator coil 23 to decrease as compared with that of the first coil end portion of the stator coil according to the comparative example set forth above.

As described above, the stator coil 23 of the alternator 1 according to the embodiment includes the first and second groups 23A and 23B each having the sophisticated structure in which the delta-connected three-phase windings and star-connected windings are combined to each other.

Particularly, in the stator coil 23 of the alternator 1 according to the embodiment, the first grouped ends of the three-phase windings of the first and second sets 330A and 340A included in the first group 23A and the second grouped ends of the three-phase windings of the first and second sets 330B and 340B of the windings included in the second group 23B are so arranged that the first grouped ends are circumferentially separated from the second grouped ends (see FIG. 8A).

This configuration allows the lengths of the connection leads 25 included in each of the first and second groups 23A and 23B to decrease, making it possible to simplify connections of the respective ends of the three-phase windings included in each of the first and second groups 23A and 23B.

In addition, as illustrated in FIGS. 5, 6, and 8A, the circumferential positions of the ends of the delta-connected three-phase windings of the first set (330A, 330B) are arranged to be circumferentially included in the circumferential positions of the ends of the remaining windings of the second set (340A, 340B). This allows the connection leads 25 connecting between the output ends of the delta-connected three-phase windings of the first set (330A, 330B) and the three-phase windings of the second set (340A, 340B) to locally concentrate in the circumferential direction of the core 22. This makes it possible to further simplify connections between the output ends of the delta-connected three-phase windings of the first set (330A, 330B) and the three-phase windings of the second set (340A, 340B). With simplicity of connections between the output ends of the delta-connected three-phase windings of the first set (330A, 330B) and the three-phase windings of the second set (340A, 340B), phase-to-phase insulation of the three-phase windings included in each of the first and second groups 23A and 23B can be easily ensured. This permits the stator core 23 and stator 2 to be easily manufactured and downsized.

The output leads 26 of each of the first and second groups 23A and 23B are locally arranged in the circumferential direction of the core 22. Accordingly, even if arrangements of the output leads 26 from the first and second groups 23A and 23B are limited to a space in the circumferential direction of the core 22 so as to meet the configuration of the rectifier assembly 5 that is determined not to interfere the brushes and/or the voltage regulator, it is possible to easily adjust the arrangements of the output leads 26 to the limited space. This can prevent complicated wiring configuration.

Moreover, the weld portions between the ends of the three-phase windings of the first set (330A, 340A) and those of the three-phase windings of the second set (330B, 340B) of each of the first and second groups 23A and 23B are circumferentially arranged to be separated from the leads 25 drawn out from the output ends of the three-phase windings of the second set (340A, 340B) of each of the first and second groups 23A and 23B. This permits interference between welding jigs for welding of the weld portions and the leads 25 drawn out from the output ends of the three-phase windings to be reduced, making it easy to manufacture the stator coil 23 and stator 2.

In the embodiment, the weld portions 332A, 334A, 336A, 332B, 334B, and 336B of the first and second groups 23A and 23B are locally arranged in a circumferential direction of the stator core 22 over radially middle portions of corresponding slots 24.

This allows a sufficient space between each of the weld portions 332A, 334A, 336A, 332B, 334B, and 336B and the axial portion of the frame 4 to be easily secured. Thus, it is unnecessary to increase the size of the frame 4 in order to avoid interference between each of the weld portions 332A, 334A, 336A, 332B, 334B, and 336B and the axial portion of the frame 4. This makes it possible to further downsize the stator coil 23 and stator 2.

Moreover, the tip ends of the windings, which form each of the weld portions 332A, 334A, 336A, 332B, 334B, and 336B, are circumferentially aligned and drawn out from the radially middle portions of the corresponding slots 24. This makes it possible to easily bundle the ends of the windings for each of the weld portions and weld them.

Furthermore, the tip end of the winding disposed at the middle of the ends of the windings forming each of the weld portions extends in the axial direction of the core 22. That is, the end of the winding disposed at the middle of the ends of the windings forming each of the weld portions extends in the axial direction of the core 22 without extending any circumferential directions. This allows oscillations occurring during rotatably drive of the alternator 1 (rotor 2) to decrease.

In the first group 23A, one ends (leads) of the windings drawn out from the corresponding slots 24 for one of the weld portions 332A, 334A, and 336A are arranged to minimize the number of intersections between the one ends of the drawn-out windings and one ends of the windings drawn out from the corresponding slots 24 for another one of the weld portions 332A, 334A, and 336A.

For example, one end (lead) of the winding drawn out from the corresponding slot 24 for one of the weld portions 332A, 334A, 336A is arranged to intersect with one end of the winding drawn out from the corresponding slot for another one of the weld portions 332A, 334A, and 336A disposed forward in the circumferential counterclockwise direction of the stator core 22 such that the one end of the winding of the one of the weld portions 332A, 334A, 336A jumps over the one end of the winding of another one of the weld portions 332A, 334A, and 336A.

However, the remaining ends of the windings drawn out from the corresponding slots 24 for the one of the weld portions 332A, 334A, and 336A are disposed not to intersect with the remaining ends drawn out from the corresponding slots 24 for another one of the weld portions 332A, 334A, and 336A disposed forward in the circumferential counterclockwise direction of the stator core 22.

Similarly, in the second group 23B, one ends (leads) of the windings drawn out from the corresponding slots 24 for one of the weld portions 332B, 334B, and 336B are arranged to minimize the number of intersections between the one ends of the drawn-out windings and one ends of the windings drawn out from the corresponding slots 24 for another one of the weld portions 332B, 334B, and 336B.

For example, one end (lead) of the winding drawn out from the corresponding slot 24 for one of the weld portions 332B, 334B, 336B is arranged to intersect with one end of the winding drawn out from the corresponding slot for another one of the weld portions 332B, 334B, and 336B disposed forward in the circumferential clockwise direction of the stator core 22 such that the one end of the winding of the one of the weld portions 332B, 334B, and 336B jumps over the one end of the winding of another one of the weld portions 332B, 334B, and 336B.

However, the remaining ends of the windings drawn out from the corresponding slots 24 for the one of the weld portions 332B, 334B, and 336B are disposed not to intersect with the remaining ends drawn out from the corresponding slots 24 for another one of the weld portions 332B, 334B, and 336B disposed forward in the circumferential clockwise direction of the stator core 22.

Accordingly, the arrangement of the ends of the windings of each of the groups 23A and 23B set forth above allows the ends of the windings to be easily drawn out from the corresponding slots 24 and to be easily bundled for the respective weld portions. This makes it possible to more easily manufacture the stator coil 23 and stator 2.

Moreover, in the embodiment, the first set (330A, 330B) of three-phase windings of each of the first and second groups 23A and 23B is disposed to be shifted in phase from the second set (340A, 340B) of three-phase windings of each of the first and second groups 23A and 23B by an electric angle of $\pi/6$ radian in phase. This arrangement allows magnetic noise to decrease. In the present invention, the first set (330A, 330B) of three-phase windings of each of the first and second groups 23A and 23B can be disposed to be shifted in phase from the second set (340A, 340B) of three-phase windings of each of the first and second groups 23A and 23B by another electric angle.

Similarly, the second group 23B of first and second sets of three-phase windings is disposed to be shifted in phase from the first group 23A of first and second sets of three-phase windings by an electric angle of $\pi/6$ radian. This arrangement permits magnetic noise to further decrease. In the present invention, the second group 23B of first and second sets of three-phase windings can be disposed to be shifted in phase from the first group 23A of first and second sets of three-phase windings by another electric angle.

In the embodiment, each of the three-phase windings included in the first and second groups 23A and 23B is made up of sequentially joined conductor segments 430, but the present invention is not limited to the structure.

Specifically, each of the three-phase windings included in the first and second groups 23A and 23B can be made up of a continuous winding wound around the slots 24 to provide a radial double-layered annular winding.

In the embodiment, it is possible to freely set the number of turns of respective three-phase windings included in each of the first and second groups 23A and 23B.

In the embodiment, each of the three-phase windings included in the first and second groups 23A and 23B is designed as a double-layered annular winding, but the present invention is not limited to the structure.

Specifically, at least one of the three-phase windings included in the first and second groups 23A and 23B can be designed as a multiple-layered ring winding whose turn portions are disposed not to be axially overlapped to each other.

In other words, at least one of the three-phase windings included in the first and second groups 23A and 23B can be designed as a multiple-layered annular winding whose turn portions have different positions in a circumferential direction of the stator core 22.

In the embodiment, the present invention is applied to an alternator for vehicles, but the present invention is not limited to the application. Specifically, the present invention can be applied to other types of rotary electric machines, such as motors for vehicles or the like.

While there has been described what is at present considered to be the embodiment and its modification of the present invention, it will be understood that various modifications which are not described yet may be made therein, and it is intended to cover in the appended claims all such modifications as fall within the true spirit and scope of the invention.

What is claimed is:

1. A rotary electric machine comprising:
   a rotor rotatably supported in a frame of the machine; and
   a stator disposed opposite to the rotor, the stator comprising: a stator core having axially opposing end surfaces and a plurality of substantially circumferentially spaced slots; and a stator coil,
   the stator coil comprising:
   a first group of first and second sets of three-phase windings mounted in the stator core, the first set including first three-phase windings each with output ends, the output ends of the first three-phase windings being connected in series to each other to form delta configuration with junctions between the first three-phase windings, the second set including second three-phase windings having output and input ends, the input ends being respectively connected in series to the junctions of the first three-phase windings, and
   a second group of third and fourth sets of three-phase windings mounted in the stator core, the third set including third three-phase windings each with output ends, the output ends of the third three-phase windings being connected in series to each other to form delta configuration with junctions between the third three-phase windings, the fourth set including fourth three-phase windings having output and input ends, the input ends being respectively connected in series to the junctions of the third three-phase windings, the output ends of the first to fourth three-phase windings and the input ends of the second and fourth windings being disposed at one of the opposing end surface sides of the stator core, the output ends of the first and second three-phase windings of the first and second sets included in the first group being separated, in a circumferential direction of the stator core, from the output ends of the third and fourth three-phase windings of the third and fourth sets included in the second group, each of the first to fourth three-phase windings being inserted in the slots while being turned at the one of the first and second opposing end surface sides of the stator core,
   wherein turn portions of each of the first to fourth three-phase windings at the one of the first and second opposing end surface sides of the stator core have a substantially U shape, and are so disposed as to be nonoverlapped with each other in an axial direction of the stator core.

2. A rotary electric machine according to claim 1, wherein the turn portions of each of the first to fourth three-phase windings at the one of the first and second opposing end surface sides of the stator core are radially arranged to form a substantially multiple ring configuration.

3. A rotary electric machine according to claim 1, wherein the first group includes first weld portions formed by welding respectively the junctions of the first three-phase windings and the input ends of the second three-phase windings together, and the second group includes second weld portions formed by welding respectively the junctions of the third three-phase windings and the input ends of the fourth three-phase windings together, the first weld portions being arranged to be separated from the output ends of the second three-phase windings, the second weld portions being arranged to be separated from the output ends of the fourth three-phase windings.

4. A rotary electric machine according to claim 3, wherein each of the slots has a predetermined length in a radial direction of the stator core, and the first and second weld portions are locally arranged over radially middle portions of corresponding slots.

5. A rotary electric machine according to claim 3, wherein each of the slots has a predetermined length in a radial direction of the stator core, each of the first weld portions is composed of:
   one of the output ends of one of the first three-phase windings,
   one of the output ends of another one of the first three-phase windings, and
   the input end of one of the second three-phase windings, the output and input ends constituting each of the first weld portions being circumferentially aligned and arranged over radially middle portions of corresponding slots, and each of the second weld portions is composed of:
   one of the output ends of one of the third three-phase windings, one of the output ends of another one of the third three-phase windings, and the input end of one of the fourth three-phase windings, the output and input ends constituting each of the second weld portions being circumferentially aligned and arranged over radially middle portions of corresponding slots.

6. A rotary electric machine according to claim 5, wherein any one of the circumferential aligned ends of each of the first weld portions is disposed at the middle thereof, and the middle-disposed end extends substantially in the axial direction of the stator core, and any one of the circumferential aligned ends of each of the second weld portions is disposed at the middle thereof, and the middle-disposed end extends substantially in the axial direction of the stator core.

7. A rotary electric machine according to claim 3, wherein the first weld portions are substantially circumferentially aligned, each of the first weld portions is composed of:

one of the output ends of one of the first three-phase windings, one of the output ends of another one of the first three-phase windings, and the input end of one of the second three-phase windings, the ends constituting one of the first weld portions and drawn out from corresponding slots are arranged to minimize the number of intersections between the drawn-out ends of the one of the first weld portions and the ends constituting another one of the first weld portions and drawn out from corresponding slots, and each of the second weld portions is composed of:

one of the output ends of one of the third three-phase windings, one of the output ends of another one of the third three-phase windings, and the input end of one of the fourth three-phase windings, the ends constituting one of the second weld portions and drawn out from corresponding slots are arranged to minimize the number of intersections between the drawn-out ends of the one of the second weld portions and the ends constituting another one of the second weld portions and drawn out from corresponding slots.

8. A rotary electric machine according to claim 7, wherein one of the drawn-out ends of the one of the first weld portions is arranged to intersect with one of the drawn-out ends of another one of the first weld portions such that the one of the drawn-out ends of the one of the first weld portions jumps over the one of the drawn-out ends of another one of the first weld portions, and wherein one of the drawn-out ends of the one of the second weld portions is arranged to intersect with one of the drawn-out ends of another one of the second weld portions such that the one of the drawn-out ends of the one of the second weld portions jumps over the one of the drawn-out ends of another one of the second weld portions.

9. A rotary electric machine according to claim 1, wherein each of the first and second three-phase windings comprises a plurality of conductor segments each of which includes a substantially U shaped portion and substantially straight portions extending therefrom and having tip end portions, one of the tip end portions of one of the conductor segments being sequentially joined to one of the tip end portions of another one of the conductor segments to form a series-connected winding in each phase corresponding to each of the first and second three-phase windings, and each of the third and fourth three-phase windings comprises a plurality of conductor segments each of which includes a substantially U shaped portion and substantially straight portions extending therefrom and having tip end portions, one of the tip end portions of one of the conductor segments being sequentially joined to one of the tip end portions of another one of the conductor segments to form a series-connected winding in each phase corresponding to each of the third and fourth three-phase windings, and wherein the U-shaped portions of the conductor segments of each of the first to fourth three-phase windings correspond to the turn portions of each of the first to fourth three-phase windings.

10. A rotary electric machine according to claim 1, wherein the turn portions of the first to fourth three-phase windings provide a coil end of the stator coil, the output ends of the first three-phase windings and the output and input ends of the second three-phase windings are arranged at the coil end of the stator coil, and the output ends of the third three-phase windings and the output and input ends of the fourth three-phase windings are arranged at the coil end of the stator coil.

11. A rotary electric machine comprising:

a rotor rotatably supported in a frame of the machine; and a stator disposed opposite to the rotor, the stator comprising: a stator core having axially opposing end surfaces and a plurality of substantially circumferentially spaced slots; and a stator coil, the stator coil comprising:

a first group of first and second sets of three-phase windings mounted in the stator core, the first set including first three-phase windings each with output ends disposed respectively at circumferential positions opposite the stator core, the output ends of the first three-phase windings being connected in series to each other to form delta configuration with junctions between the first three-phase windings, the second set including second three-phase windings having output and input ends, the input ends being respectively connected in series to the junctions of the first three-phase windings, and a second group of third and fourth sets of three-phase windings mounted in the stator core, the third set including third three-phase windings each with output ends disposed respectively at circumferential positions opposite the stator core, the output ends of the third three-phase windings being connected in series to each other to form delta configuration with junctions between the third three-phase windings, the fourth set including fourth three-phase windings having output and input ends, the input ends being respectively connected in series to the junctions of the third three-phase windings, the output ends of the first to fourth three-phase windings and the input ends of the second and fourth windings being disposed at one of the opposing end surface sides of the stator core, each of the first to fourth three-phase windings being inserted in the slots while being turned at the one of the first and second opposing end surface sides of the stator core, the circumferential positions of the output positions of at least one of the first three-phase windings and the third three-phase windings are disposed to be included in the circumferential positions of the output ends of at least one of the second three-phase windings and the fourth three-phase windings, wherein turn portions of each of the first to fourth three-phase windings at the one of the first and second opposing end surface sides of the stator core have a substantially U shape, and are so disposed as to be nonoverlapped with each other in an axial direction of the stator core.

12. A stator comprising:

a stator core having axially opposing end surfaces and a plurality of substantially circumferentially spaced slots; and a stator coil, the stator coil comprising:

a first group of first and second sets of three-phase windings mounted in the stator core, the first set including first three-phase windings each with output ends, the output ends of the first three-phase windings being connected in series to each other to form delta configuration with junctions between the first three-phase windings, the second set including second three-phase windings having output and input ends, the input ends being respectively connected in series to the junctions of the first three-phase windings; and a second group of third and fourth sets of three-phase windings mounted in the stator core, the third set including third three-phase windings each with output ends, the output ends of the third three-phase windings being connected in series to each other to form delta configuration with junctions between the third three-phase windings, the fourth set including fourth three-phase windings having output and input ends, the input ends being respectively connected in series to the junctions of the third three-phase windings, the output ends of the first to fourth three-phase windings and the input ends of the second and fourth windings being disposed at one of the opposing end surface sides of the stator core, the output ends of the first and second three-phase windings of the first and second sets included in the first group being separated, in a circumferential direction of the stator core, from the output ends of the third and fourth three-phase windings of the third and fourth sets included in the second group, each of the first to fourth three-phase windings being inserted in the slots while being turned at the one of the first and second opposing end surface sides of the stator core, wherein turn portions of each of the first to fourth three-phase windings at the one of the first and second opposing end surface sides of the stator core have a substantially U shape, and are so disposed as to be nonoverlapped with each other in an axial direction of the stator core.

13. A stator comprising:

a stator core having axially opposing end surfaces and a plurality of substantially circumferentially spaced slots; and a stator coil, the stator coil comprising:

a first group of first and second sets of three-phase windings mounted in the stator core, the first set including first three-phase windings each with output ends disposed respectively at circumferential positions opposite the stator core, the output ends of the first three-phase windings being connected in series to each other to form delta configuration with junctions between the first three-phase windings, the second set including second three-phase windings having output and input ends, the input ends being respectively connected in series to the junctions of the first three-phase windings; and a second group of third and fourth sets of three-phase windings mounted in the stator core, the third set including third three-phase windings each with output ends disposed respectively at circumferential positions opposite the stator core, the output ends of the third three-phase windings being connected in series to each other to form delta configuration with junctions between the third three-phase windings, the fourth set including fourth three-phase windings having output and input ends, the input ends being respectively connected in series to the junctions of the third three-phase windings, the output ends of the first to fourth three-phase windings and the input ends of the second and fourth windings being disposed at one of the opposing end surface sides of the stator core, each of the first to fourth three-phase windings being inserted in the slots while being turned at the one of the first and second opposing end surface sides of the stator core, the circumferential positions of the output positions of at least one of the first three-phase windings and the third three-phase windings are disposed to be included in the circumferential positions of the output ends of at least one of the second three-phase windings and the fourth three-phase windings, wherein turn portions of each of the first to fourth three-phase windings at the one of the first and second opposing end surface sides of the stator core have a substantially U shape, and are so disposed as to be nonoverlapped with each other in an axial direction of the stator core.

* * * * *